(12) United States Patent (10) Patent No.: US 8,710,775 B2
Sagami et al. (45) Date of Patent: Apr. 29, 2014

(54) ELECTRIC POWER STEERING APPARATUS

(75) Inventors: Hiroki Sagami, Utsunomiya (JP); Kyoji Hamamoto, Utsunomiya (JP); Hiroaki Horii, Utsunomiya (JP); Fumihiro Morishita, Tochigi-ken (JP); Takuji Wada, Utsunomiya (JP); Shinji Hironaka, Tochigi-ken (JP); Takashi Kuribayashi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 13/344,294

(22) Filed: Jan. 5, 2012

(65) Prior Publication Data

US 2012/0176069 A1 Jul. 12, 2012

(30) Foreign Application Priority Data

Jan. 7, 2011 (JP) ................................. 2011-002522
Jan. 7, 2011 (JP) ................................. 2011-002523

(51) Int. Cl.
*H02P 21/00* (2006.01)

(52) U.S. Cl.
USPC ........................ 318/400.02; 318/798; 318/432

(58) Field of Classification Search
USPC ............ 318/400.02, 798, 432, 433, 434, 802, 318/803
See application file for complete search history.

(56) References Cited

U.S. PATENT DOCUMENTS

| | | | |
|---|---|---|---|
| 2006/0055243 A1 | 3/2006 | Matsushita et al. | |
| 2006/0076832 A1 | 4/2006 | Matsushita et al. | |
| 2007/0176577 A1 | 8/2007 | Kezobo et al. | |
| 2008/0297958 A1 | 12/2008 | Suzuki | |
| 2009/0021207 A1* | 1/2009 | Kezobo et al. | 318/798 |
| 2009/0240389 A1* | 9/2009 | Nomura et al. | 701/29 |
| 2009/0251831 A1 | 10/2009 | Shiba et al. | |

FOREIGN PATENT DOCUMENTS

| | | | |
|---|---|---|---|
| CN | 1769092 A | 5/2006 | |
| CN | 101485080 A | 7/2009 | |
| DE | 10 2005 042 093 A1 | 3/2006 | |
| JP | 11-008992 A | 1/1999 | |
| JP | 2004-064839 A | 2/2004 | |
| JP | 2006-256542 A | 9/2006 | |
| JP | 2006-256550 A | 9/2006 | |
| JP | 2007-037274 A | 2/2007 | |
| JP | 2007-135281 A | 5/2007 | |
| JP | 2008-301658 A | 12/2008 | |
| JP | 2009-090817 A | 4/2009 | |
| JP | 2009-214711 A | 9/2009 | |
| JP | 2010-137627 A | 6/2010 | |

OTHER PUBLICATIONS

CN Office Action dated Dec. 30, 2013, issued over the corresponding Chinese Patent Application 201210000828.8, with the English translation of pertinent portion.

* cited by examiner

*Primary Examiner* — Karen Masih
(74) *Attorney, Agent, or Firm* — Carrier Blackman & Associates, P.C.; Joseph P. Carrier; William D. Blackman

(57) ABSTRACT

An electric power steering apparatus detects, as an abnormal phase, a phase other than a combination of phases whose interphase voltage is of nearly zero volts if a q-axis current is equal to or smaller than a first threshold value though a q-axis voltage is being applied. Alternatively, the electric power steering apparatus calculates a base electric angle at which the q-axis current is equal to or smaller than a third threshold value though the q-axis voltage is being applied, and determines an abnormal phase based on the base electric angle.

3 Claims, 24 Drawing Sheets

ELECTRIC POWER STEERING APPARATUS

CROSS-REFERENCE TO RELATED APPLICATION

This application is based upon and claims the benefit of priority from Japanese Patent Applications No. 2011-002522 filed on Jan. 7, 2011, and No. 2011-002523 filed on Jan. 7, 2011, of which the contents are incorporated herein by reference.

BACKGROUND OF THE INVENTION

1. Field of the Invention

The present invention relates to an electric power steering apparatus which includes an electric motor that applies a force (steering assisting force) for assisting in a steering action made by the driver of a motor vehicle when the driver turns the steering wheel of the motor vehicle.

2. Description of the Related Art

There are known electric power steering apparatus which include an electric motor that applies a force (steering assisting force) for assisting in a steering action made by the driver of a motor vehicle in order to allow the driver to lightly turn the steering wheel of the motor vehicle {see U.S. Patent Application Publication No. 2007/0176577 (hereinafter referred to as "US 2007/0176577 A1"), Japanese Laid-Open Patent Publication No. 2009-090817 (hereinafter referred to as "JP 2009-090817 A1"), and Japanese Laid-Open Patent Publication No. 2006-256542 (hereinafter referred to as "JP 2006-256542 A1")}.

According to US 2007/0176577 A1, currents for the respective three phases of an electric motor are detected (see [0055] through [0058] and FIG. 17), and it is judged whether such currents are flowing or not, whereby it is determined whether there is a phase with an abnormality (abnormal phase) or not (see [0059] through [0060]). If an abnormal phase occurs, then the switching devices of an inverter are controlled with respect to the normal phases other than the abnormal phase (see Abstract and claims 15, 17).

According to JP 2009-090817 A1, currents for two of the three phases (a U-phase current and a W-phase current) are detected, and a current for one remaining phase is calculated from the detected currents for the two phases and used for subsequent inverter control (see FIG. 2 and [0023]). According to JP 2006-256542 A1, similarly, currents for two of the three phases (a U-phase current and a V-phase current) are detected, and a current for one remaining phase is calculated from the detected currents for the two phases and used for subsequent inverter control (see FIG. 2, [0012] and [0018]).

SUMMARY OF THE INVENTION

As described above, according to US 2007/0176577 A1, an abnormal phase is identified by detecting currents for the respective three phases. With the arrangements for detecting currents for two of the three phases as disclosed in JP 2009-090817 A1 and JP 2006-256542 A1, however, it is difficult to identify an abnormal phase if an abnormality such as a disconnection or the like happens to any of the phases.

It is an object of the present invention to provide an electric power steering apparatus which is capable of detecting an abnormal phase of an electric motor thereof even in the case where currents for two of the three phases are detected.

According to the present invention, there is provided an electric power steering apparatus comprising an inverter for supplying three-phase AC electric power to three phases of an electric motor, a current coordinate converting unit for converting currents flowing in the three phases of the electric motor into d-q coordinate currents including a d-axis current as an exciting current component and a q-axis current as a torque current component, a voltage coordinate converting unit for converting three-phase voltages applied to the electric motor into a d-axis voltage and a q-axis voltage, and an abnormal phase detecting unit for detecting, as an abnormal phase, a phase other than a combination of phases whose interphase voltage is of nearly zero volts in a state where the q-axis current is equal to or smaller than a first threshold value though the q-axis voltage is being applied.

With the above arrangement, a phase other than a combination of phases whose interphase voltage is of nearly zero volts is detected as an abnormal phase in a state where the q-axis current is equal to or smaller than a first threshold value though the q-axis voltage is being applied. Therefore, if a value (e.g., zero or a value near zero) that cannot be taken depending on the q-axis voltage is established as the first threshold value for the q-axis current, then an abnormal phase can be detected even though current sensors are provided in association with only two phases and no current sensor is provided in association with the remaining phase. The invention is also applicable to an arrangement wherein current sensors are provided in association with all the three phases for the purpose of increasing the accuracy with which to detect an abnormal phase.

The electric power steering apparatus may further comprise a rotational speed detecting unit for detecting a rotational speed of the electric motor, and the abnormal phase detecting unit may be operated when the rotational speed is equal to or smaller than a second threshold value. If a rotational speed at which a counter-electromotive force generated by the electric motor adversely affects the accuracy with which to identify an abnormal phase, or a nearby rotational speed is established as the second threshold value, then an abnormal phase can be identified only when a certain level of accuracy is secured. An abnormal phase is thus prevented from being detected in error.

If the abnormal phase detecting unit detects an abnormal phase while all the three phases are being energized, the phases other than the abnormal phase are energized such that output power of the electric motor is increased near an electric angle at which the output power of the electric motor tends to be reduced due to malfunctioning of the abnormal phase. Therefore, even in the presence of an abnormal phase, the output power of the electric motor is prevented from being abruptly lowered, and hence the electric motor is capable of stably generating a steering assisting force.

According to the present invention, there is also provided an electric power steering apparatus comprising an inverter for supplying three-phase AC electric power to three phases of an electric motor, a current coordinate converting unit for converting currents flowing in the three phases of the electric motor into d-q coordinate currents including a d-axis current as an exciting current component and a q-axis current as a torque current component, a voltage coordinate converting unit for converting three-phase voltages applied to the electric motor into a d-axis voltage and a q-axis voltage, and a rotational angle detecting unit for detecting a rotational angle of the electric motor, wherein a base electric angle at which the q-axis current is equal to or smaller than a third threshold value though the q-axis voltage is being applied is calculated, and an abnormal phase is determined based on the base electric angle.

With the above arrangement, a base electric angle at which the q-axis current is equal to or smaller than a third threshold value though the q-axis voltage is being applied is calculated, and an abnormal phase is determined based on the base electric angle. Therefore, if a value (e.g., zero or a value near zero) that cannot be taken if the phases are operating normally is established as the third threshold value, then an abnormal phase can be detected even though current sensors are provided in association with only two phases and no current sensor is provided in association with the remaining phase. The invention is also applicable to an arrangement wherein current sensors are provided in association with all the three phases for the purpose of increasing the accuracy with which to detect an abnormal phase.

While the d-axis voltage is being generated, a corrective electric angle may be calculated from the d-axis voltage and the q-axis voltage, and an abnormal phase may be determined based on the base electric angle and the corrective electric angle. Therefore, even if the electric angle at which the q-axis current is equal to or smaller than the third threshold due to the generation of the d-axis voltage deviates from the base electric angle, it is possible to correct the base electric angle in view of the effect of the d-axis voltage. Therefore, an abnormal phase can be determined highly accurately.

The electric power steering apparatus may further comprise a rotational speed detecting unit for detecting a rotational speed of the electric motor, and an abnormal phase may be determined if the rotational speed is equal to or smaller than a fourth threshold value. Therefore, if a rotational speed at which a counter-electromotive force generated by the electric motor adversely affects the accuracy with which to identify an abnormal phase, or a nearby rotational speed is established as the fourth threshold value, then an abnormal phase can be identified only when a certain level of accuracy is secured. An abnormal phase is thus prevented from being detected in error.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

I. First Embodiment

A: Description of Configurations

Figure 1:
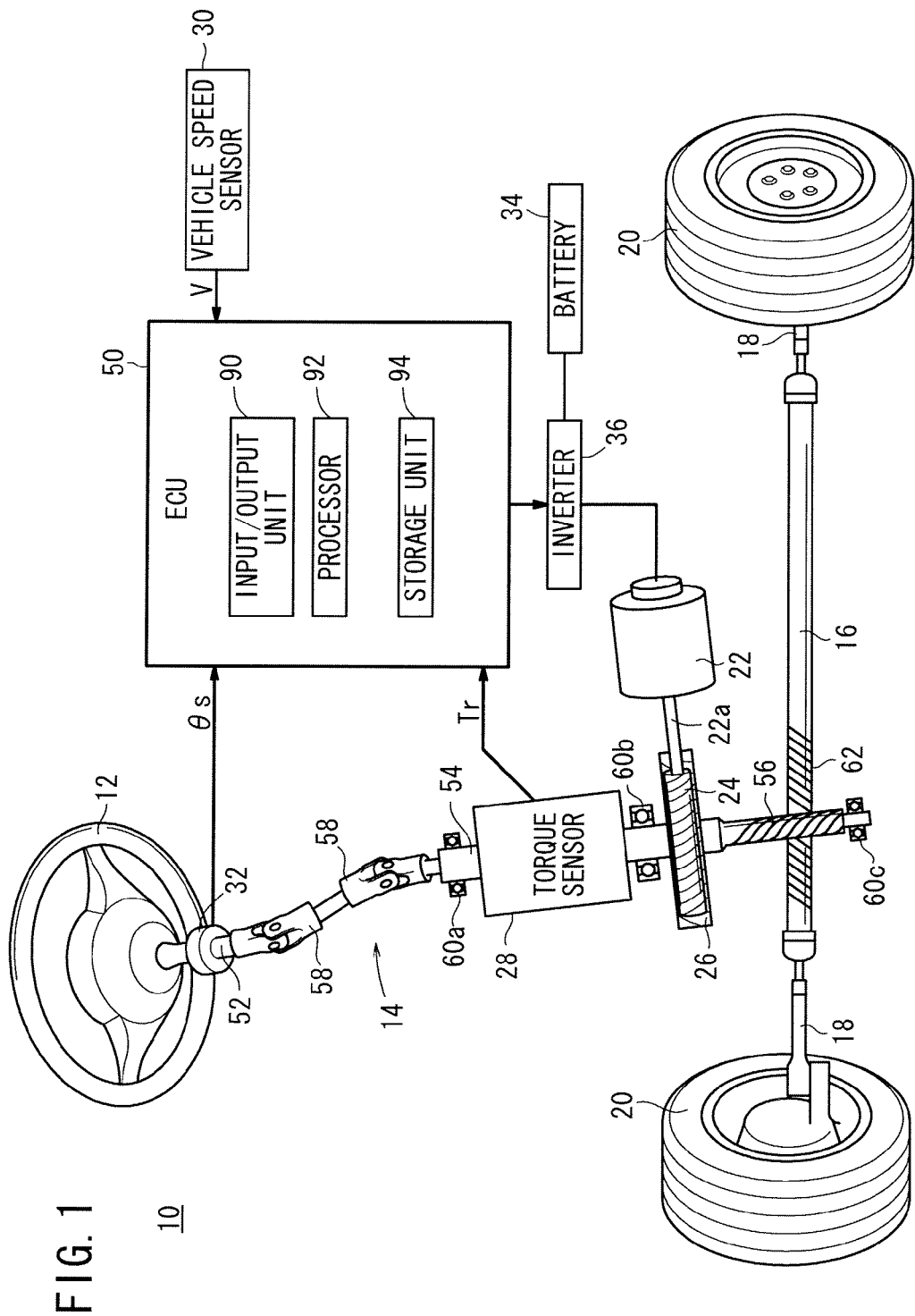
FIG. 1 is a schematic view, partly in block form, of an electric power steering apparatus according to a first embodiment of the present invention.
Figure 2:
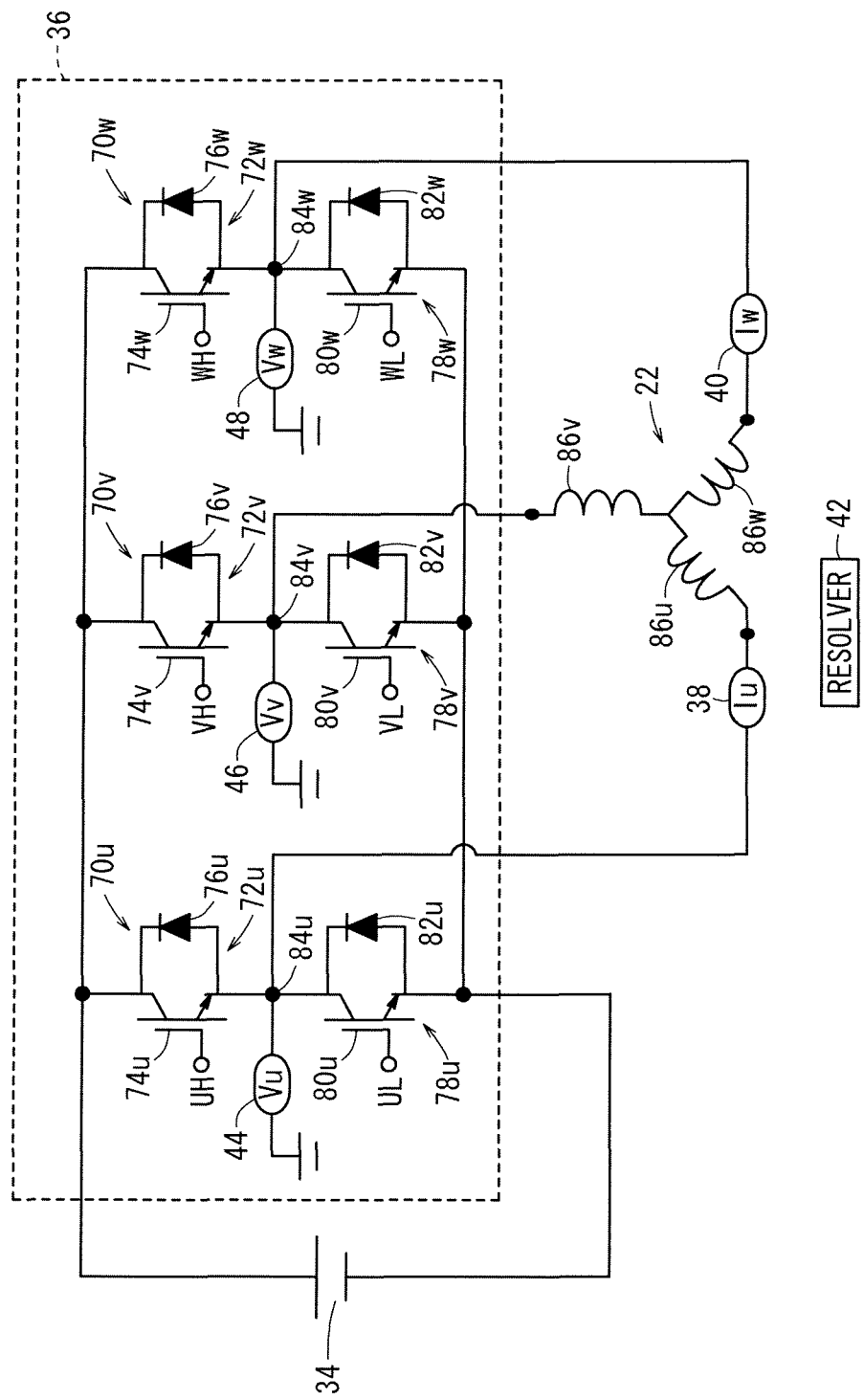
FIG. 2 is a circuit diagram of parts of the electric power steering apparatus according to the first embodiment.

1. Overall Arrangement of Electric Power Steering Apparatus 10:

FIG. 1 is a schematic view, partly in block form, of an electric power steering apparatus 10 (hereinafter also referred to as "power steering apparatus 10") according to a first embodiment of the present invention, which is incorporated in a motor vehicle. FIG. 2 is a circuit diagram of parts of the electric power steering apparatus 10.

As shown in FIG. 1, the power steering apparatus 10 includes a steering handle 12 (steering wheel), a steering shaft 14, a rack shaft 16, tie rods 1, and left and right front road wheels 20 as steerable wheels of the motor vehicle. The steering shaft 14, the rack shaft 16, and the tie rods 18 make up a manual steering system for directly transmitting a steering action that is applied to the steering handle 12 by the driver of the motor vehicle, to the front road wheels 20.

As shown in FIGS. 1 and 2, the power steering apparatus 10 also includes an electric motor 22, a worm gear 24, a worm wheel gear 26, a torque sensor 28, a vehicle speed sensor 30, a steering angle sensor 32, a battery 34, an inverter 36, current sensors 38, 40, a resolver (rotational angle detecting unit) 42, voltage sensors 44, 46, 48, and an electronic control unit 50 (hereinafter referred to as "ECU 50"). The electric motor 22, the worm gear 24, and the worm wheel gear 26 make up an assistive drive system for generating a force (steering assisting force) for assisting in the steering action made by the driver. The torque sensor 28, the vehicle speed sensor 30, the steering angle sensor 32, the inverter 36, the current sensors 38, 40, the resolver 42, the voltage sensors 44, 46, 48, and the ECU 50 make up an assistive control system for controlling the assistive drive system. The assistive drive system, the assistive control system, and the battery 34 will hereinafter also be collectively referred to as "steering assisting system".

2. Manual Steering System:

The steering shaft 14 includes a main steering shaft 52 integrally coupled to the steering handle 12, a pinion shaft 54 having a pinion 56 of a rack and pinion mechanism, and universal joints 58 interconnecting the main steering shaft 52 and the pinion shaft 54.

The pinion shaft 54 has an upper portion, an intermediate portion, a lower portion, which are supported respectively by bearings 60a, 60b and 60c. The pinion 56 is disposed on a lower end portion of the pinion shaft 54. The pinion 56 is held in mesh with rack teeth 62 of the rack shaft 16 that is movable axially back and forth in transverse directions of the motor vehicle.

When the driver turns the steering handle 12, the steering handle 12 produces a steering torque Tr (rotary force), which is transmitted to the pinion shaft 54 through the main steering shaft 52 and the universal joints 58. The pinion 56 of the pinion shaft 54 and the rack teeth 62 of the rack shaft 16 convert the steering torque Tr into a thrust force, which displaces the rack shaft 16 in the transverse directions of the motor vehicle. When the rack shaft 16 is displaced, the tie rods 18 steer the front road wheels 20 to change the direction of the motor vehicle.

3. Steering Assisting System:

(1) Assistive Drive System:

The electric motor 22 is operatively connected to the rack shaft 16 through the worm gear 24 and the worm wheel gear 26. More specifically, the electric motor 22 has an output shaft 22a connected to the worm gear 24. The worm wheel gear 26 which is in mesh with the worm gear 24 is mounted on the pinion shaft 54, which is operatively connected to the rack shaft 16 through the pinion 56 and the rack teeth 62.

The electric motor 22, which is a three-phase AC brushless motor, is supplied with electric power from the battery 34 via the inverter 36 that is controlled by the ECU 50, and generates a drive force (steering assisting force) depending on the electric power. The drive force is transmitted through the output shaft 22a, the worm gear 24, and the pinion shaft 54 (the worm wheel gear 26 and the pinion 56) to the rack shaft 16, thereby assisting the driver in turning the steering handle 12.

(2) Assistive Control System:

(a) Feed-Forward System Sensors:

The torque sensor 28 is disposed between the bearing 60a on the upper portion of the pinion shaft 54 and the bearing 60b on the intermediate portion of the pinion shaft 54. The torque sensor 28 detects a steering torque Tr based on a change in magnetic characteristics caused by a magnetostrictive effect, and outputs the detected steering torque Tr to the ECU 50.

The vehicle speed sensor 30 detects a vehicle speed V [km/h] and outputs the detected vehicle speed V to the ECU 50. The steering angle sensor 32 detects a steering angle θs [degrees] of the steering handle 12 and outputs the detected steering angle θs to the ECU 50.

The steering torque Tr, the vehicle speed V, and the steering angle θs are used in a feed-forward control process by the ECU 50.

(b) Inverter 36:

The inverter 36, which is of a three-phase bridge configuration, has a DC-to-AC converting capability which converts a direct current from the battery 34 into three-phase alternating currents and supplies the three-phase alternating currents to the electric motor 22.

As shown in FIG. 2, the inverter 36 has three-phase arms 70u, 70v, 70w, i.e., a U-phase arm 70u, a V-phase arm 70v, and a W-phase arm 70w. The U-phase arm 70u comprises an upper arm device 72u having an upper switching device 74u (hereinafter referred to as "upper SW device 74u") and a diode 76u, and a lower arm device 78u having a lower switching device 80u (hereinafter referred to as "lower SW device 80u") and a diode 82u.

Similarly, the V-phase arm 70v includes an upper arm device 72v having an upper switching device 74v (hereinafter referred to as "upper SW device 74v") and a diode 76v, and a lower arm device 78v having a lower switching device 80v (hereinafter referred to as "lower SW device 80v") and a diode 82v. The W-phase arm 70w includes an upper arm device 72w having an upper switching device 74w (hereinafter referred to as "upper SW device 74w") and a diode 76w, and a lower arm device 78w having a lower switching device 80w (hereinafter referred to as "lower SW device 80w") and a diode 82w.

Each of the upper SW devices 74u, 74v, 74w and the lower SW devices 80u, 80v, 80w comprises a MOSFET or an IGBT, for example.

The phase arms 70u, 70v, 70w will hereinafter collectively be referred to as "phase arms 70"). The upper arm devices 72u, 72v, 72w will hereinafter collectively be referred to as "upper arm devices 72"), and the lower arm devices 78u, 78v, 78w will hereinafter collectively be referred to as "lower arm devices 78"). The upper SW devices 74u, 74v, 74w will hereinafter collectively be referred to as "upper SW devices 74", and the lower SW devices 80u, 80v, 80w will hereinafter collectively be referred to as "lower SW devices 80"

In the phase arms 70, midpoints 84u, 84v, 84w between the upper arm devices 72 and the lower arm devices 78 are connected respectively to windings 86u, 86v, 86w of the electric motor 22. The windings 86u, 86v, 86w will hereinafter collectively be referred to as "windings 86".

The upper SW devices 74 and the lower SW devices 80 are energized by respective drive signals UH, VH, WH, UL, VL, WL from the ECU 50.

(c) Feedback System Sensors:

The current sensor 38 detects a current of the U-phase (U-phase current Iu) in the winding 86u of the electric motor 22, and outputs the detected U-phase current Iu to the ECU 50. Similarly, the current sensor 40 detects a current of the W-phase (W-phase current Iw) in the winding 86w of the electric motor 22, and outputs the detected W-phase current Iw to the ECU 50. The current sensors 38, 40 may detect currents in other phase combinations than the U-phase and the W-phase as long as they detect currents in two of the three phases of the electric motor 22.

The resolver 42 detects an electric angle θ as a rotational angle of the output shaft 22a or an outer rotor (not shown) of the electric motor 22, and outputs the detected electric angle θ to the ECU 50.

The voltage sensor 44 detects a voltage at the midpoint 84u of the U-phase arm 70u (hereinafter referred to as "U-phase voltage Vu"), and outputs the detected U-phase voltage Vu to the ECU 50. The voltage sensor 46 detects a voltage at the midpoint 84v of the V-phase arm 70v (hereinafter referred to as "V-phase voltage Vv"), and outputs the detected V-phase voltage Vv to the ECU 50. The voltage sensor 48 detects a voltage at the midpoint 84w of the W-phase arm 70w (hereinafter referred to as "W-phase voltage Vw"), and outputs the detected W-phase voltage Vw to the ECU 50.

Figure 3:
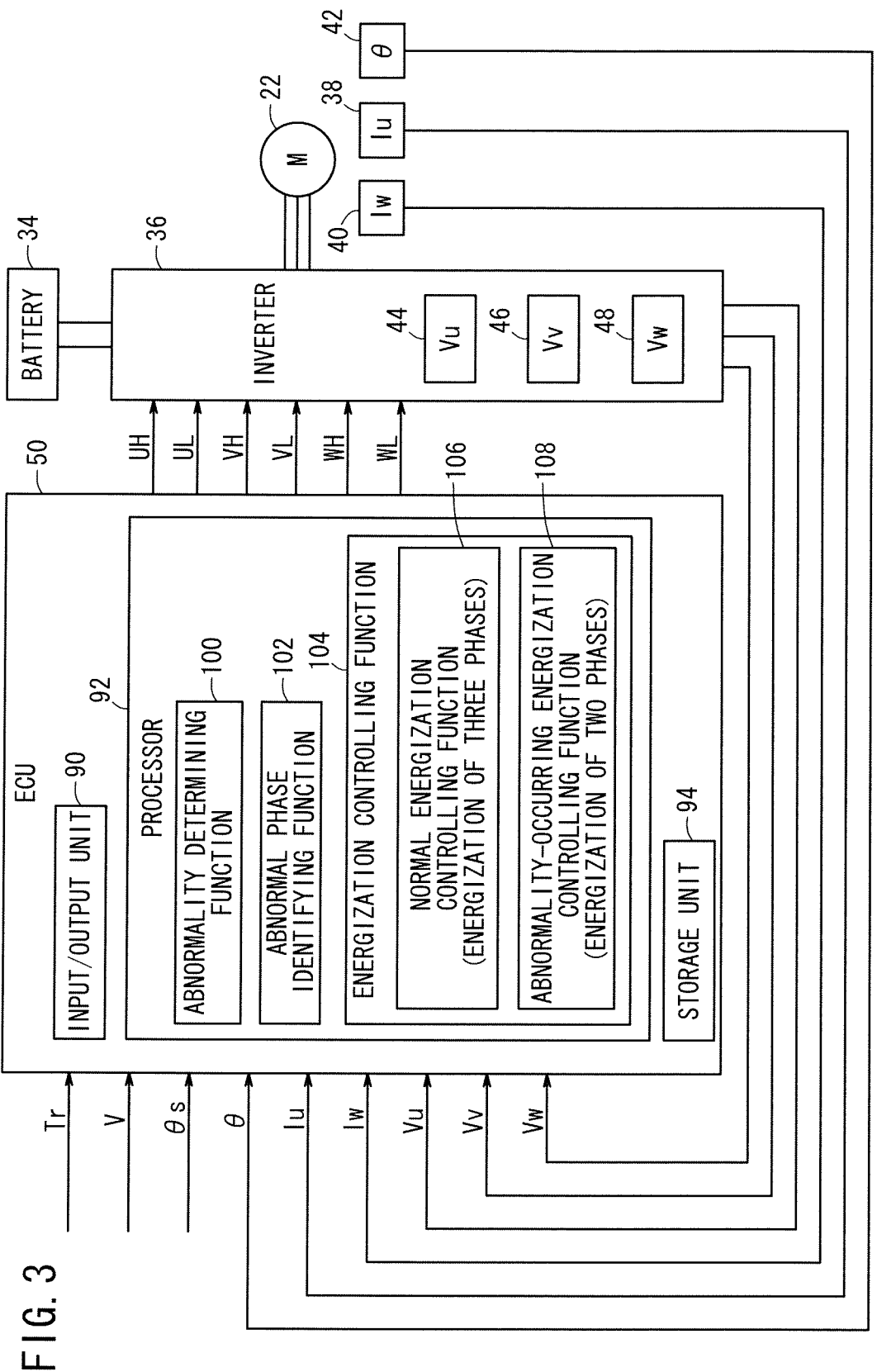
FIG. 3 is a block diagram showing internal configurations and functions of an electronic control unit (ECU) and input and output lines connected to the ECU according to the first embodiment.

(d) ECU 50:

FIG. 3 shows in block form internal configurations and functions of the ECU 50 and input and output lines connected to the ECU 50. The ECU 50 controls output power of the electric motor 22 based on output values from the various sensors described above.

As shown in FIGS. 1 and 3, the ECU 50 includes an input/output unit 90, a processor 92, and a storage unit 94 as hardware units. As shown in FIG. 3, the processor 92 of the ECU 50 includes an abnormality determining function (rotational speed detecting unit) 100, an abnormal phase identifying function (abnormal phase detecting unit) 102, and an energization controlling function 104. The energization controlling function 104 includes a normal energization controlling function 106 and an abnormality-occurring energization controlling function 108. These functions are performed by executing programs stored in the storage unit 94, as described in detail later.

(3) Battery 34:

The battery 34 is an electric energy storage device capable of outputting a low voltage (12 volts in the present embodiment), and may be a secondary battery such as a lead storage battery or the like.

B. Processing Sequences and Functions of ECU 50

Figure 4:
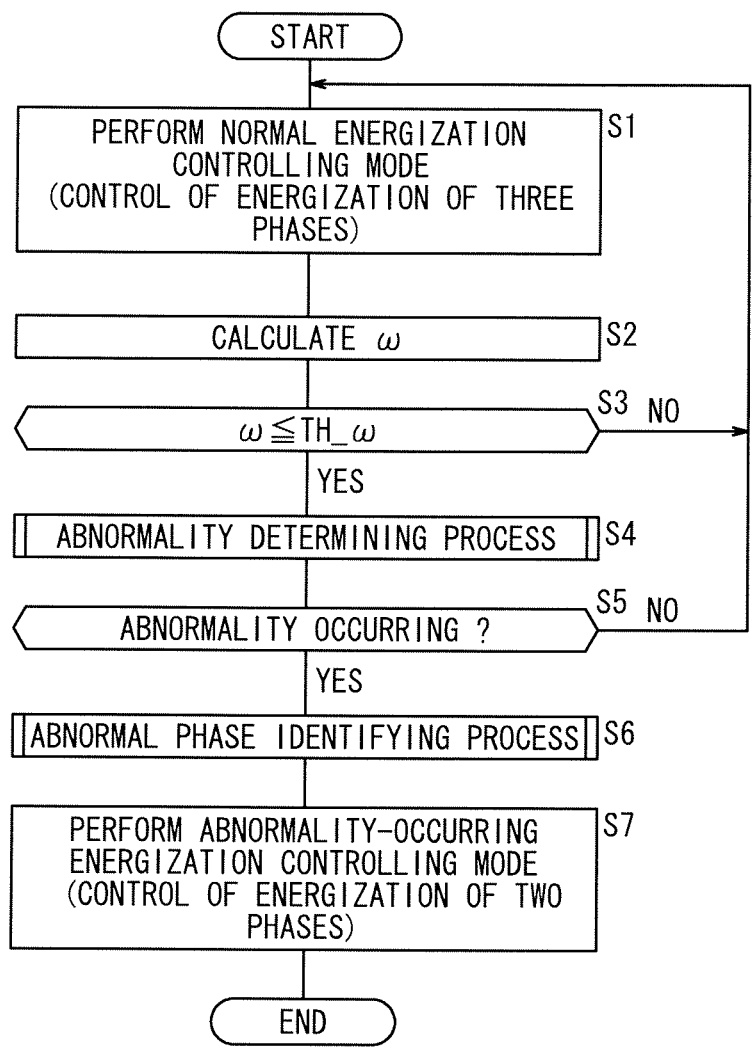
FIG. 4 is a flowchart of a processing sequence of the ECU according to the first embodiment.

1. Overall Flow:

FIG. 4 is a flowchart of an overall processing sequence of the ECU 50 according to the present embodiment. In step S1, the ECU 50 carries out a normal energization controlling mode using the normal energization controlling function 106. In the normal energization controlling mode, the ECU 50 controls output power of the electric motor 22 using the three phase arms 70 (see FIG. 2) of the inverter 36, as described in detail later.

In step S2, the ECU 50 (abnormality determining function 100) calculates a rotational speed ω [degrees/sec.] of the electric motor 22 based on the electric angle θ from the resolver 42.

In step S3, the ECU 50 (abnormality determining function 100) determines whether or not the rotational speed ω calculated in step S2 is equal to or smaller than a threshold value TH_ω. The threshold value TH_ω is a threshold value for determining whether an abnormality determining process in step S4 is to be carried out or not. More specifically, the threshold value TH_ω is a threshold value for determining whether or not the electric motor 22 is generating an excessive counter-electromotive force which makes the accuracy of the abnormality determining process inadequate, and is stored in the storage unit 94.

If the rotational speed ω is not equal to or smaller than the threshold value TH_ω (S3: NO), then control goes back to step S1. If the rotational speed ω is equal to or smaller than the threshold value TH_ω (S3: YES), then the ECU 50 carries out an abnormality determining process using the abnormality determining function 100 in step S4. If the determination result in step S4 indicates that no abnormality is occurring (S5: NO), then control goes back to step S1.

If the determination result in step S4 indicates that an abnormality is occurring (S5: YES), then the ECU 50 carries out an abnormal phase identifying process in step S6. Based on the result from the abnormal phase identifying process, the ECU 50 carries out an abnormality-occurring energization controlling mode in step S7, as described in detail later.

Figure 5:
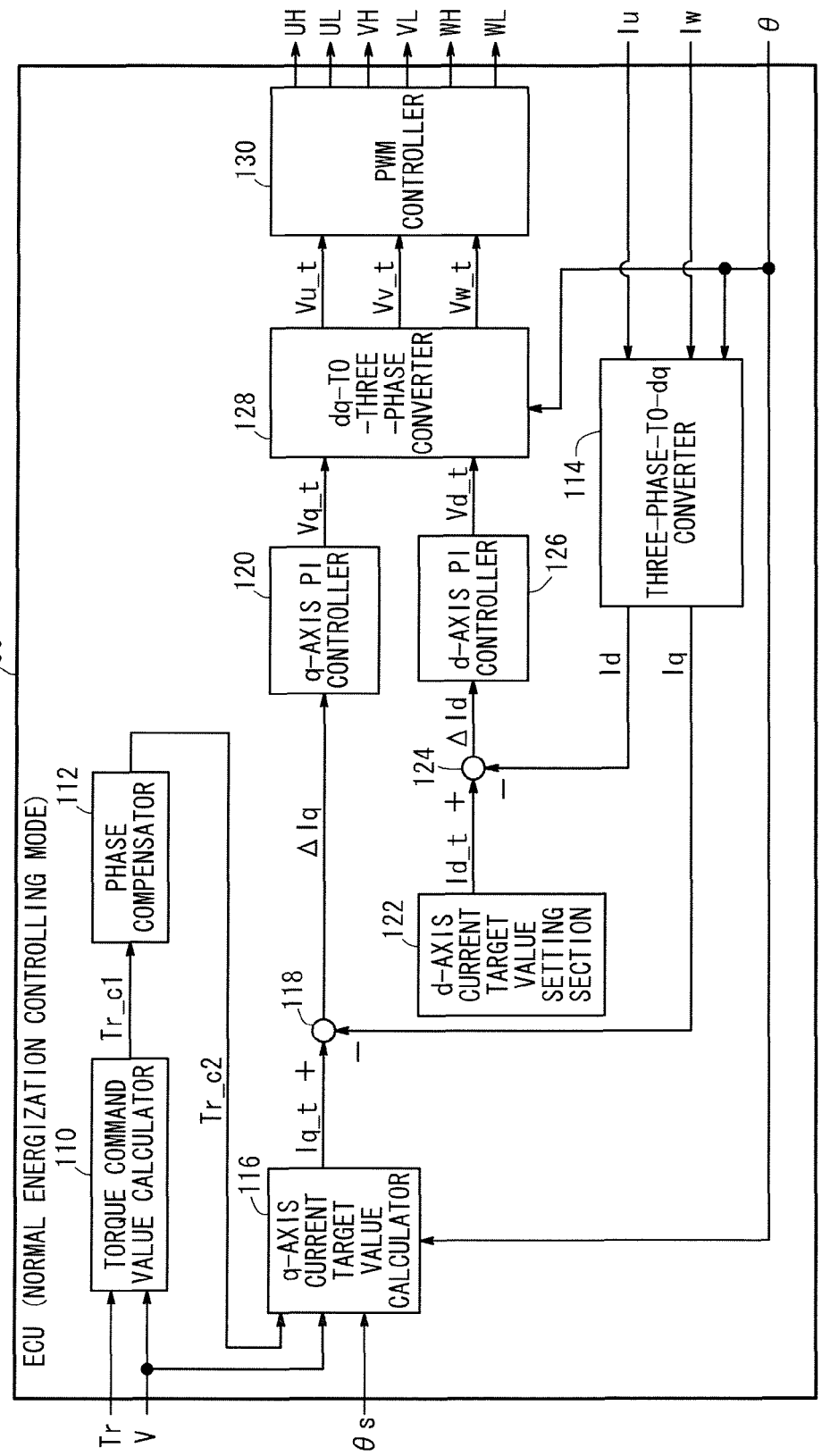
FIG. 5 is a functional block diagram of the ECU in a normal energization controlling mode.

2. Normal Energization Controlling Mode (Normal Energization Controlling Function 106):

FIG. 5 is a functional block diagram of the ECU 50 in the normal energization controlling mode.

As shown in FIG. 5, the ECU 50 in the normal energization controlling mode includes a torque command value calculator 110, a phase compensator 112, a three-phase-to-dq converter (current coordinate converting unit) 114, a q-axis current target value calculator 116, a first subtractor 118, a q-axis PI controller (voltage coordinate converting unit) 120, a d-axis current target value setting section 122, a second subtractor 124, a d-axis PI controller (voltage coordinate converting unit) 126, a dq-to-three-phase converter 128, and a PWM controller 130. The ECU 50 controls the inverter 36 using these functional components. The inverter 36 may basically be controlled by the control system disclosed by JP 2009-090817 A1 or JP 2006-256542 A1, and also components disclosed by JP 2009-090817 A1 or JP 2006-256542 A1 are additionally applicable to functional components which are omitted in the present embodiment.

The torque command value calculator 110 calculates a torque command value (hereinafter referred to as "first torque command value Tr_c1") based on the steering torque Tr from the torque sensor 28 and the vehicle speed V from the vehicle speed sensor 30. The phase compensator 112 calculates a torque command value (hereinafter referred to as "second torque command value Tr_c2") by performing a phase compensation process on the first torque command value Tr_c1.

The three-phase-to-dq converter 114 performs a three-phase-to-dq converting process using the U-phase current Iu from the current sensor 38, the W-phase current Iw from the current sensor 40, and the electric angle θ from the resolver 42, and calculates a d-axis current Id as a current component in a d-axis direction (field current component) and a q-axis current Iq as a current component in a q-axis direction (torque current component). The three-phase-to-dq converter 114 outputs the q-axis current Iq to the first subtractor 118 and outputs the d-axis current Id to the second subtractor 124.

The three-phase-to-dq converting process is a process for converting a set of the U-phase current Iu, the W-phase current Iw and a V-phase current Iv, which is determined by the currents Iu, Iw (i.e., Iv=−Iu−Iw), into a set of the d-axis current Id and the q-axis current Iq according to a conversion matrix depending on the electric angle θ.

The q-axis current target value calculator 116 calculates a target value for the q-axis current Iq (hereinafter referred to as "q-axis current target value Iq_t") based on the second torque command value Tr_c2 from the phase compensator 112, the vehicle speed V from the vehicle speed sensor 30, the steering angle θs from the steering angle sensor 32, and the electric angle θ from the resolver 42. More specifically, the q-axis current target value calculator 116 calculates a q-axis current target value Iq_t according to a combination of a reference assistive control process, an inertia control process, and a damper control process, for example. The reference assistive control process, the inertia control process, and the damper control process may be the control processes disclosed in JP 2009-090817 A1 and JP 2006-256542 A1 or Japanese Laid-Open Patent Publication No. 2009-214711, for example. The q-axis current target value Iq_t serves as a feed-forward command value for the d-axis current and the q-axis current for causing the output shaft 22a of the electric motor 22 to generate a torque according to the second torque command value Tr_c2.

The first subtractor 118 calculates the deviation between the q-axis current target value Iq_t and the q-axis current Iq (=Iq_t—Iq) (hereinafter referred to as "q-axis current deviation ΔIq"), and outputs the calculated q-axis current deviation ΔIq to the q-axis PI controller 120. The q-axis PI controller 120 calculates a target value for a q-axis voltage (hereinafter referred to as "q-axis voltage target value Vq_t") according to a PI control process (proportional-integral control process) as a feedback control process such that the q-axis current deviation ΔIq is reduced close to zero, and outputs the calculated q-axis voltage target value Vq_t to the dq-to-three-phase converter 128.

The d-axis current target value setting section 122 sets a target value for the d-axis current Id (hereinafter referred to as "d-axis current target value Id_t") which is necessary for the windings 86 of the electric motor 22 to function as a magnet, and outputs the set d-axis current target value Id_t to the second subtractor 124.

The second subtractor 124 calculates the deviation between the d-axis current target value Id_t and the d-axis current Id (=Id_t−Id) (hereinafter referred to as "d-axis current deviation ΔId"), and outputs the calculated d-axis current deviation ΔId to the d-axis PI controller 126. The d-axis PI controller 126 calculates a d-axis voltage target value Vd_t as a target value for a d-axis voltage according to a PI control process (proportional-integral control process) as a feedback control process such that the d-axis current deviation ΔId is reduced close to zero, and outputs the calculated d-axis voltage target value Vd_t to the dq-to-three-phase converter 128.

The dq-to-three-phase converter 128 performs a dq-to-three-phase converting process using the q-axis voltage target value Vq_t from the q-axis PI controller 120, the d-axis voltage target value Vd_t from the d-axis PI controller 126, and the electric angle θ from the resolver 42, and calculates voltage target values for the U-phase, the V-phase and the W-phase (hereinafter referred to as "phase voltage target values Vu_t, Vv_t, Vw_t"), and then the converter 128 outputs the calculated phase voltage target values Vu_t, Vv_t, Vw_t to the PWM controller 130. The dq-to-three-phase converting process is a process for converting a set of the d-axis voltage target value Vd_t and the q-axis voltage target value Vq_t into a set of the phase voltage target values Vu_t, Vv_t, Vw_t according to a conversion matrix depending on the electric angle θ.

Based on the phase voltage target values Vu_t, Vv_t, Vw_t, the PWM controller 130 energizes the windings 86 of the electric motor 22 through the inverter 36 according to a pulse width modulation (PWM) control process. More specifically, the PWM controller 130 selectively turns on and off the upper SW devices 74 and the lower SW devices 80 of the inverter 36 thereby to energize the windings 86 of the electric motor 22.

Specifically, the PWM controller 130 generates drive signals UH, UL, VH, VL, WH, WL for the phase arms 70 in each switching period. If it is assumed that a duty ratio DUT in overall one switching period is 100%, then a duty ratio DUT2 for the lower SW devices 80 is calculated by subtracting a duty ratio DUT1 for the upper SW devices 74 from 100%. Further, a dead time dt is reflected in the duty ratios DUT1, DUT2 for the upper SW devices 74 and the lower SW devices 80. Therefore, the drive signals UH, UL, VH, VL, WH, WL that are actually output are representative of the duty ratios DUT1, DUT2 with the dead time dt reflected therein.

Figure 6:
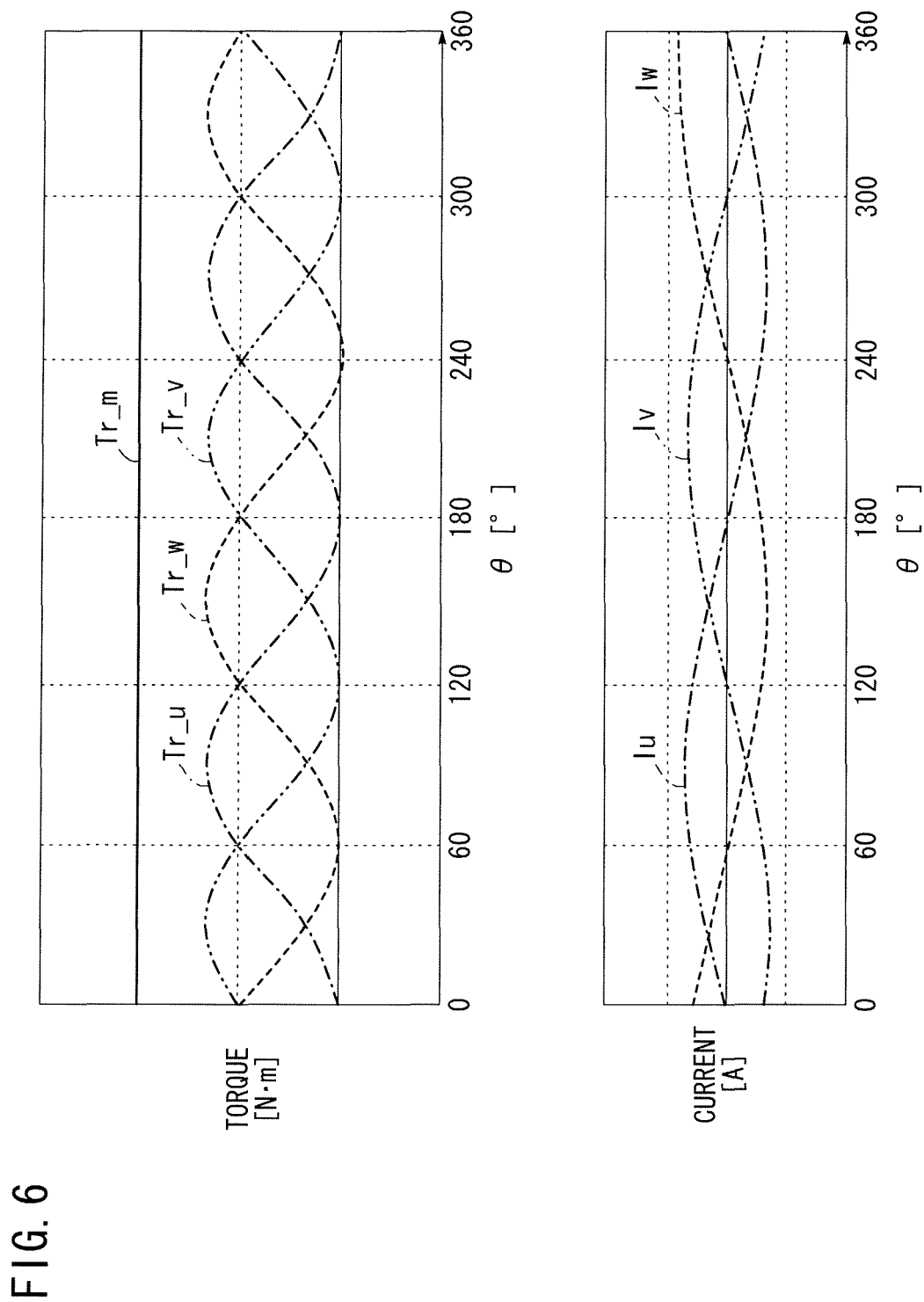
FIG. 6 is a diagram showing, by way of example, waveforms representing the torques of respective phases of the electric motor, a steering assisting torque, and the currents of the respective phases in the normal energization controlling mode.

According to the above normal energization controlling mode, torques generated by the phases (hereinafter referred to as "U-phase torque Tr_u", "V-phase torque Tr_v", "W-phase torque Tr_w") in the normal energization controlling mode, a total torque (hereinafter referred to as "motor torque Tr_m") output from the electric motor 22 as the sum of the U-phase torque Tr_u, the V-phase torque Tr_v and the W-phase torque Tr_w, and currents in the phases (U-phase current Iu, V-phase current Iv, W-phase current Iw) have waveforms as shown in FIG. 6, for example.

Figure 7:
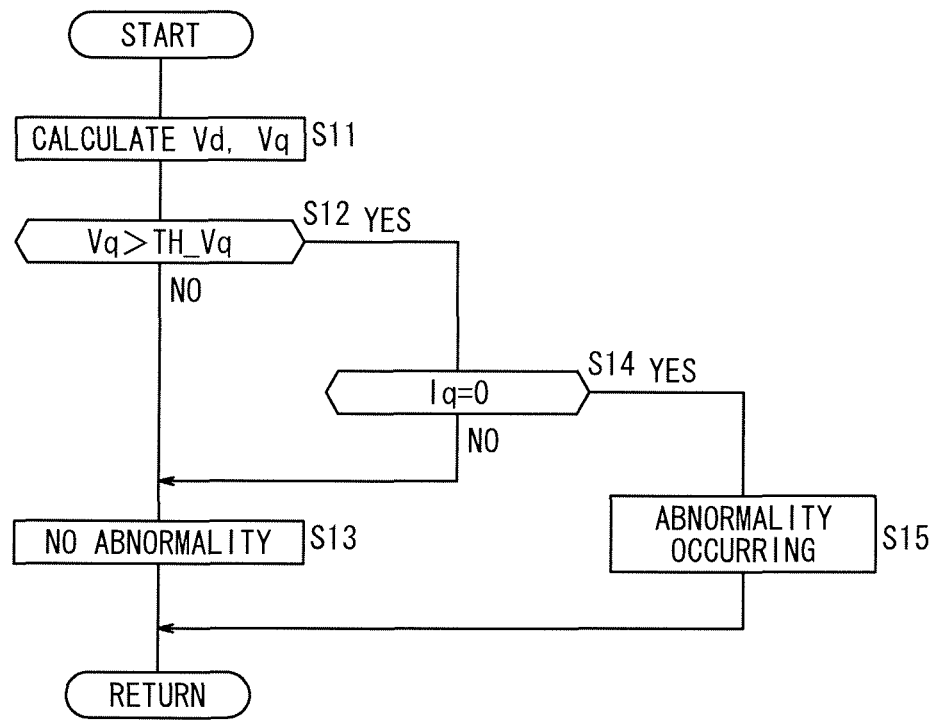
FIG. 7 is a flowchart of an abnormality determining process carried out by the ECU according to the first embodiment.

3. Abnormality Determining Process (Abnormality Determining Function 100):

FIG. 7 is a flowchart of the abnormality determining process (abnormality determining function 100) carried out by the ECU 50 (details of step S4 shown in FIG. 4). In step S11, the ECU 50 determines the d-axis voltage Vd and the q-axis voltage Vq by way of calculations. More specifically, the ECU 50 performs a three-phase-to-dq converting process on the U-phase voltage Vu from the voltage sensor 44, the V-phase voltage Vv from the voltage sensor 46, and the W-phase voltage Vw from the voltage sensor 48, using the electric angle θ, to determine the d-axis voltage Vd and the q-axis voltage Vq.

In step S12, the ECU 50 determines whether the q-axis voltage Vq determined in step S11 is greater than a threshold value TH_Vq or not. The threshold value TH_Vq is a threshold value for determining the q-axis voltage Vq is output or not.

If the q-axis voltage Vq is not greater than the threshold value TH_Vq (S12: NO), the ECU 50 decides that no abnormality is occurring in step S13, and control goes back to the processing sequence shown in FIG. 4. If the q-axis voltage Vq is greater than the threshold value TH_Vq (S12: YES), then control goes to step S14.

In step S14, the ECU 50 determines whether the q-axis current Iq is zero or not. The ECU 50 can thus determine whether the q-axis current Iq is being generated or not. Instead of this decision process, a positive threshold value may be established for the absolute value of the q-axis current Iq, and the ECU 50 may determine whether or not the q-axis current Iq is equal to or smaller than the positive threshold value, thereby determining whether a q-axis current Iq corresponding to the q-axis voltage Vq is being generated or not.

If the q-axis current Iq is not zero (S14: NO), then control goes to step S13. If the q-axis current Iq is zero (S14: YES), then it is judged that no q-axis current Iq is flowing though the q-axis voltage Vq is output. In this case, an abnormality is occurring with no current flowing in either one of the phases (phase arms 70), e.g., one of the signal lines from the PWM controller 130 to the SW devices 74, 80 is being disconnected.

Then, the ECU 50 identifies the occurrence of an abnormality in step S15 (at this time, which phase is suffering from the abnormality is not identified).

Figure 8:
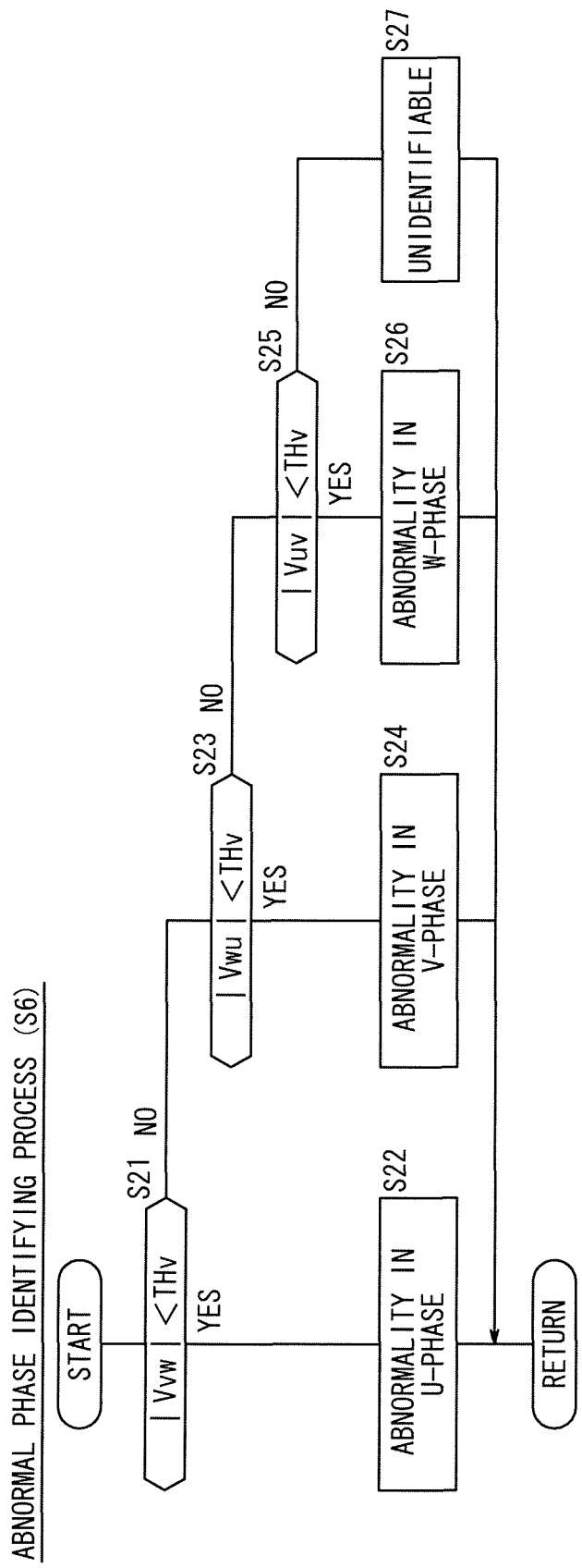
FIG. 8 is a flowchart of an abnormal phase identifying process carried out by the ECU according to the first embodiment.

4. Abnormal Phase Identifying Process (Abnormal Phase Identifying Function 102):

FIG. 8 is a flowchart of an abnormal phase identifying process (abnormal phase identifying function 102) carried out by the ECU 50 (details of step S6 shown in FIG. 4). In step S21, the ECU 50 determines whether the absolute value of a correlative voltage between the V-phase voltage Vv from the voltage sensor 46 and the W-phase voltage Vw from the voltage sensor 48 (hereinafter referred to as "VW interphase voltage Vvw") is lower than a threshold value THv or not. The VW interphase voltage Vvw is defined as the difference between the V-phase voltage Vv and the W-phase voltage Vw (Vvw=Vv−Vw). The threshold value THv serves to determine whether the VW interphase voltage Vvw is zero or is of a value close to zero, i.e., whether the V-phase voltage Vv and the W-phase voltage Vw are substantially equal to each other or not.

If the absolute value of the VW interphase voltage Vvw is smaller than the threshold value THv (S21: YES), then since VW interphase voltage Vvw is substantially zero, the V-phase and the W-phase are functioning properly. Therefore, it is decided that the phase in which the abnormality is occurring is the U-phase. In step S22, the ECU 50 identifies the U-phase as the phase in which the abnormality is occurring. If the absolute value of the VW interphase voltage Vvw is not smaller than the threshold value THv (S21: NO), then control goes to step S23.

In step S23, the ECU 50 determines whether the absolute value of a correlative voltage between the W-phase voltage Vw from the voltage sensor 48 and the U-phase voltage Vu from the voltage sensor 44 (hereinafter referred to as "WU interphase voltage Vwu") is lower than the threshold value THv or not. The WU interphase voltage Vwu is defined as the difference between the W-phase voltage Vw and the U-phase voltage Vu (Vwu=Vw−Vu). The ECU 50 can thus determine whether the WU interphase voltage Vwu is zero or is of a value close to zero, i.e., whether the W-phase voltage Vw and the U-phase voltage Vu are substantially equal to each other or not.

If the absolute value of the WU interphase voltage Vwu is smaller than the threshold value THv (S23: YES), then since WU interphase voltage Vwu is substantially zero, the W-phase and the U-phase are functioning properly. Therefore, it is decided that the phase in which the abnormality is occurring is the V-phase. In step S24, the ECU 50 identifies the V-phase as the phase in which the abnormality is occurring. If the absolute value of the WU interphase voltage Vwu is not smaller than the threshold value THv (S23: NO), then control goes to step S25.

In step S25, the ECU 50 determines whether the absolute value of a correlative voltage between the U-phase voltage Vu from the voltage sensor 44 and the V-phase voltage Vv from the voltage sensor 46 (hereinafter referred to as "UV interphase voltage Vuv") is lower than the threshold value THv or not. The UV interphase voltage Vuv is defined as the difference between the U-phase voltage Vu and the V-phase voltage Vv (Vuv=Vu−Vv). The ECU 50 can thus determine whether the UV interphase voltage Vuv is zero or is of a value close to zero, i.e., whether the U-phase voltage Vu and the V-phase voltage Vv are substantially equal to each other or not.

If the absolute value of the UV interphase voltage Vuv is smaller than the threshold value THv (S25: YES), then since UV interphase voltage Vuv is substantially zero, the U-phase and the V-phase are functioning properly. Therefore, it is decided that the phase in which the abnormality is occurring is the W-phase. In step S26, the ECU 50 identifies the W-phase as the phase in which the abnormality is occurring. If the absolute value of the UV interphase voltage Vuv is not smaller than the threshold value THv (S25: NO), then the ECU 50 is unable to identify a phase in which the abnormality is occurring (abnormal phase). In this case, two phases may be suffering abnormalities which prevent currents from flowing in the two phases. In step S27, the ECU 50 decides that it is unable to identify an abnormal phase. The ECU 50 then shuts down the electric motor 22 according to a fail-safe function thereof.

Figure 9:
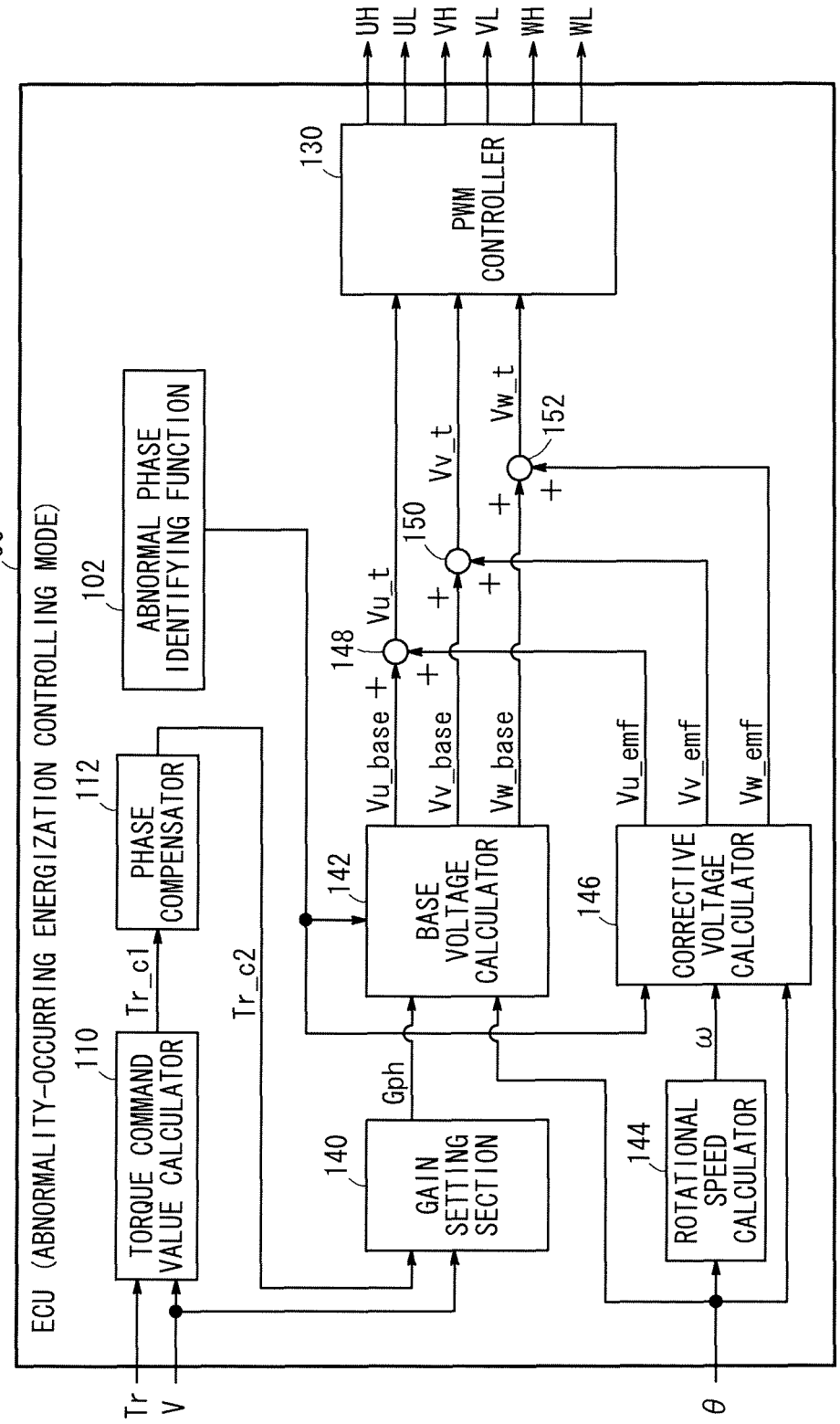
FIG. 9 is a functional block diagram of the ECU according to the first embodiment in an abnormality-occurring energization controlling mode.

5. Abnormality-Occurring Energization Controlling Mode (Abnormality-Occurring Energization Controlling Function 108):

(1) Overall Arrangement:

FIG. 9 is a functional block diagram of the ECU 50 in the abnormality-occurring energization controlling mode. Those components shown in FIG. 9 which are identical to the components in FIG. 5 are denoted by identical reference characters, and will not be described in detail below.

As shown in FIG. 9, the ECU 50 in the abnormality-occurring energization controlling mode includes a torque command value calculator 110, a phase compensator 112, a gain setting section 140, an abnormal phase identifying function 102, a base voltage calculator 142, a rotational speed calculator 144, a corrective voltage calculator 146, a first adder 148, a second adder 150, a third adder 152, and a PWM controller 130. The ECU 50 controls the inverter 36 using these functional components.

(2) Torque Command Value Calculator 110 and Phase Compensator 112.

As with the normal energization controlling mode, the torque command value calculator 110 calculates a first torque command value Tr_c1 based on the steering torque Tr from the torque sensor 28 and the vehicle speed V from the vehicle speed sensor 30. The phase compensator 112 calculates a second torque command value Tr_c2 by performing a phase compensation process on the first torque command value Tr_c1.

Figure 10:
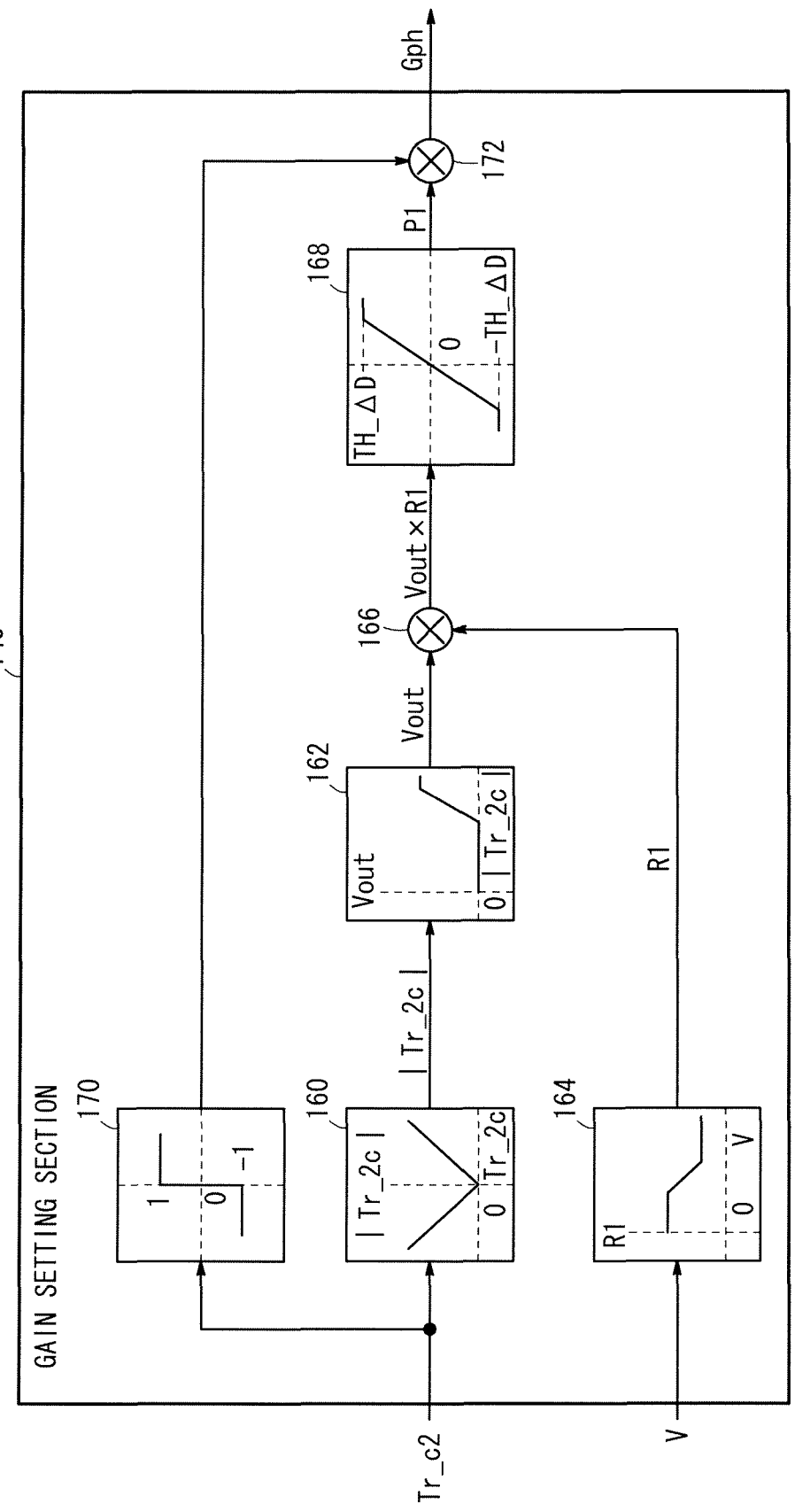
FIG. 10 is a functional block diagram of a gain setting section of the ECU according to the first embodiment.

(3) Gain Setting Section 140:

FIG. 10 is a functional block diagram of the gain setting section 140. The gain setting section 140 calculates a gain Gph based on the second torque command value Tr_c2 and the vehicle speed V. As shown in FIG. 10, the gain setting section 140 includes an absolute value converter 160, an output voltage table 162 for energizing two phases, a vehicle speed gain table 164 for energizing two phases, a first multiplier 166, a rate limiting processor 168, a sign converter 170, and a second multiplier 172.

The absolute value converter 160 calculates an absolute value of the second torque command value Tr_c2 and outputs the calculated absolute value to the output voltage table 162. The output voltage table 162 for energizing two phases outputs an output voltage Vout depending on the absolute value of the second torque command value Tr_c2 to the first multiplier 166. The output voltage Vout serves to set output power of the electric motor 22 depending on the second torque command value Tr_c2.

The vehicle speed gain table 164 for energizing two phases outputs a ratio R1 depending on the vehicle speed V to the first multiplier 166. The ratio R1 is used to reduce the output power of the electric motor 22 to prevent the steering handle 12 from being turned excessively when the vehicle speed V is high, for example. The first multiplier 166 calculates a product Vout×R1 of the output voltage Vout and the ratio R1, and outputs the product Vout×R1 to the rate limiting processor

168. The product Vout×R1 is of a value representing the steering torque Tr applied by the driver with the vehicle speed V reflected therein.

The rate limiting processor 168 adjusts a deviation ΔD between previous and present values of the product Vout×R1 such that the absolute value of the deviation ΔD does not exceed a positive threshold value TH_ΔD. Specifically, if the absolute value of the deviation ΔD is equal to or smaller than the threshold value TH_ΔD, then the rate limiting processor 168 outputs the deviation ΔD as an updated value P1. If the deviation ΔD is of a positive value greater than the threshold value TH_ΔD, then the rate limiting processor 168 outputs the threshold value TH_ΔD as an updated value P1. If the deviation ΔD is smaller than a value which is produced by multiplying the threshold value TH_ΔD by −1 (ΔD<−TH_ΔD), then the rate limiting processor 168 outputs the value which is produced by multiplying the threshold value TH_ΔD by −1 as an updated value P1.

The sign converter 170 outputs 1 when the second torque command value Tr_c2 is positive, and outputs −1 when the second torque command value Tr_c2 is negative. The sign converter 170 makes it possible to tell whether the steering handle 12 is turned in one direction or the other (i.e., rotated to the left or right).

The second multiplier 172 outputs the product of the updated value P1 and the output value (−1 or 1) from the sign converter 170 as the gain Gph.

(4) Base Voltage Calculator 142:

As shown in FIG. 9, the base voltage calculator 142 calculates base voltages (hereinafter referred to as "base voltages Vu_base, Vv_base, Vw_base") for the respective phases based on the gain Gph, the electric angle θ, and the identification result (i.e., which phase is suffering from an abnormality) by the abnormal phase identifying function 102.

Specifically, if the U-phase is suffering an abnormality, then the base voltage calculator 142 calculates base voltages Vu_base, Vv_base, Vw_base according to the expressions (1) through (6) shown below. The base voltages Vu_base, Vv_base, Vw_base represent phase voltage gains set depending on the steering action made by the driver.

(a) For $0° \leq \Phi < 180°$:

$$Vu\_base = 0 \qquad (1)$$

$$Vv\_base = Gph \times (1 - 0.5 \sin \Phi) \qquad (2)$$

$$Vw\_base = -Gph \times (1 - 0.5 \sin \Phi) \qquad (3)$$

(b) For $180° \leq \Phi < 360°$:

$$Vu\_base = 0 \qquad (4)$$

$$Vv\_base = Gph \times (-1 - 0.5 \sin \Phi) \qquad (5)$$

$$Vw\_base = -Gph \times (-1 - 0.5 \sin \Phi) \qquad (6)$$

Figure 11:
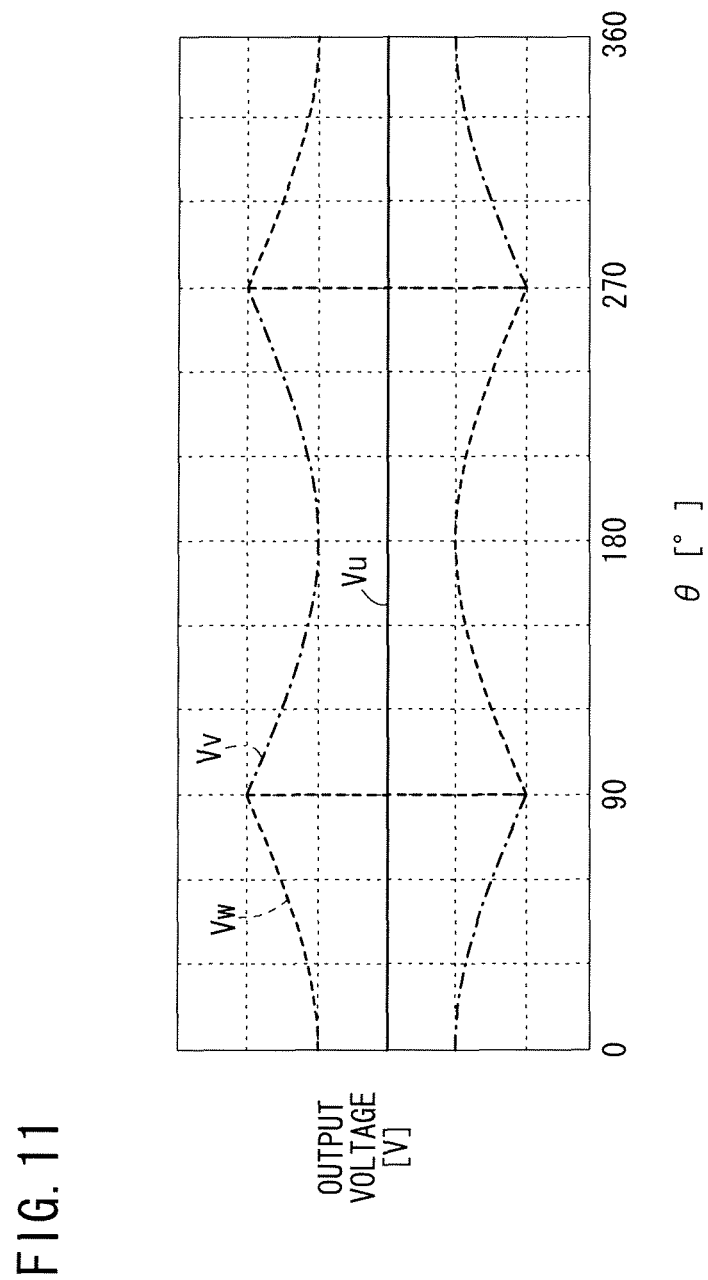
FIG. 11 is a diagram showing a relationship between electric angles of the electric motor and output voltages of the respective phases thereof in the abnormality-occurring energization controlling mode in the event of an abnormality that occurs in a U-phase.

In the above expressions (1) through (6), Φ is defined as the sum of the electric angle θ and 270° (Φ=θ+270°) within the range of $0° \leq \Phi < 360°$. The base voltages Vu_base, Vv_base, Vw_base are indicated as shown in FIG. 11, for example. In a case where the U-phase is suffering an abnormality, if control is in the normal energization controlling mode (three-phase energization controlling mode), then the electric motor 22 does not generate a steering assisting force when the electric angle θ is 90° and 270°. In the abnormality-occurring energization controlling mode, however, as shown in FIG. 11, the base voltages Vv_base, Vw_base are increased when the electric angle θ is close to 90° and 270°, making it possible to reduce the effect of no steering assisting force generated by the electric motor 22 when the electric angle θ is 90° and 270°.

If the V-phase is suffering an abnormality, then the base voltage calculator 142 calculates base voltages Vu_base, Vv_base, Vw_base according to the expressions (7) through (12) shown below.

(c) For $0° \leq \Phi < 180°$:

$$Vv\_base = 0 \qquad (7)$$

$$Vw\_base = Gph \times (1 - 0.5 \sin \Phi) \qquad (8)$$

$$Vu\_base = -Gph \times (1 - 0.5 \sin \Phi) \qquad (9)$$

(d) For $180° \leq \Phi < 360°$:

$$Vv\_base = 0 \qquad (10)$$

$$Vw\_base = Gph \times (-1 - 0.5 \sin \Phi) \qquad (11)$$

$$Vu\_base = -Gph \times (-1 - 0.5 \sin \Phi) \qquad (12)$$

Figure 12:
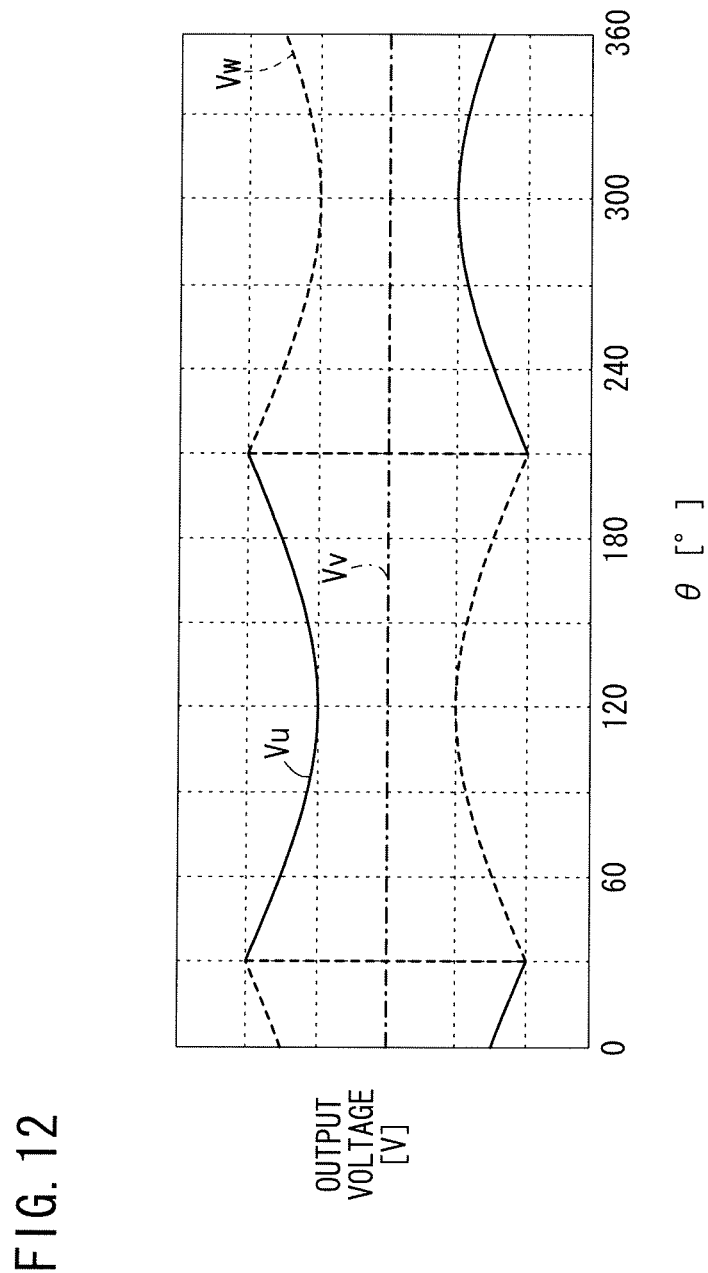
FIG. 12 is a diagram showing a relationship between electric angles of the electric motor and output voltages of the respective phases thereof in the abnormality-occurring energization controlling mode in the event of an abnormality that occurs in a V-phase.

In the above expressions (7) through (12), Φ is defined as the sum of the electric angle θ and 150° (Φ=θ+150°) within the range of $0° \leq \Phi < 360°$. The base voltages Vu_base, Vv_base, Vw_base are indicated as shown in FIG. 12, for example. In a case where the V-phase is suffering an abnormality, if control is in the normal energization controlling mode (three-phase energization controlling mode), then the electric motor 22 does not generate a steering assisting force when the electric angle θ is 30° and 210°. In the abnormality-occurring energization controlling mode, however, as shown in FIG. 12, the base voltages Vw_base, Vu_base are increased when the electric angle θ is close to 30° and 210°, making it possible to reduce the effect of no steering assisting force generated by the electric motor 22 when the electric angle θ is 30° and 210°.

If the W-phase is suffering an abnormality, then the base voltage calculator 142 calculates base voltages Vu_base, Vv_base, Vw_base according to the expressions (13) through (18) shown below.

(e) For $0° \leq \Phi < 180°$:

$$Vw\_base = 0 \qquad (13)$$

$$Vu\_base = Gph \times (1 - 0.5 \sin \Phi) \qquad (14)$$

$$Vv\_base = -Gph \times (1 - 0.5 \sin \Phi) \qquad (15)$$

(f) For $180° \leq \Phi < 360°$:

$$Vw\_base = 0 \qquad (16)$$

$$Vu\_base = Gph \times (-1 - 0.5 \sin \Phi) \qquad (17)$$

$$Vv\_base = -Gph \times (-1 - 0.5 \sin \Phi) \qquad (18)$$

Figure 13:
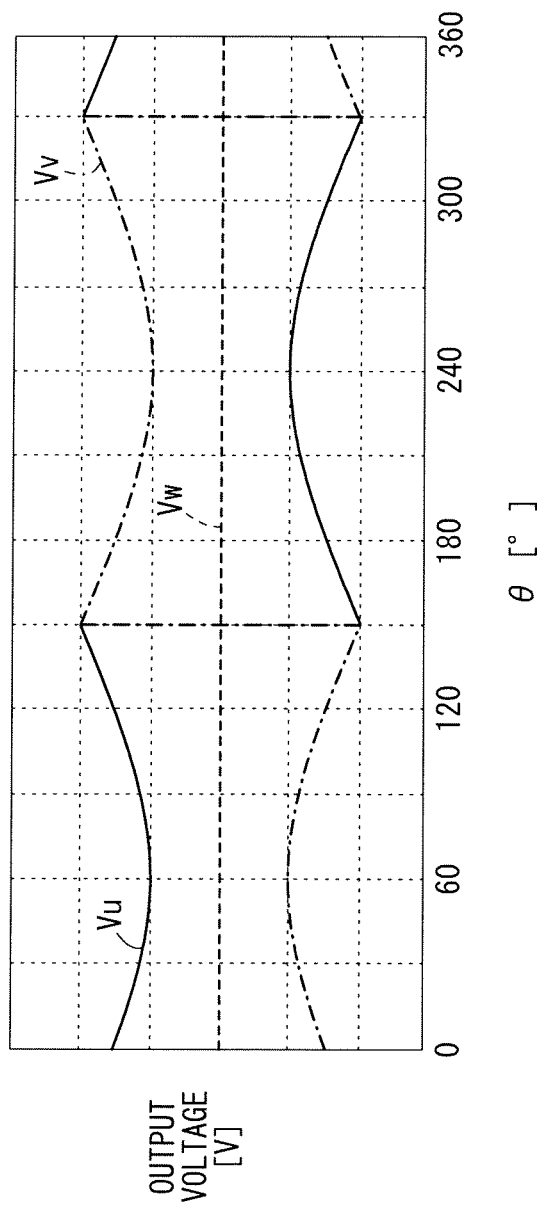
FIG. 13 is a diagram showing the relationship between electric angles of the electric motor and output voltages of the respective phases thereof in the abnormality-occurring energization controlling mode in the event of an abnormality that occurs in a W-phase.

In the above expressions (13) through (18), Φ is defined as the sum of the electric angle θ and 30° (Φ=θ+30°) within the range of $0° \leq \Phi < 360°$. The base voltages Vu_base, Vv_base, Vw_base are indicated as shown in FIG. 13, for example. In a case where the W-phase is suffering an abnormality, if control is in the normal energization controlling mode (three-phase energization controlling mode), then the electric motor 22 does not generate a steering assisting force when the electric angle θ is 150° and 330°. In the abnormality-occurring energization controlling mode, however, as shown in FIG. 13, the base voltages Vu_base, Vv_base are increased when the electric angle θ is close to 150° and 330°, making it possible to reduce the effect of no steering assisting force generated by the electric motor 22 when the electric angle θ is 150° and 330°.

(5) Rotational Speed Calculator 144:

The rotational speed calculator 144 shown in FIG. 9 calculates a rotational speed ω of the electric motor 22 based on the electric angle θ from the resolver 42.

(6) Corrective Voltage Calculator 146:

The corrective voltage calculator 146 calculates corrective voltages (hereinafter referred to as "corrective voltages Vu_emf, Vv_emf, Vw_emf") for the respective phases based on the electric angle θ, the rotational speed w, and the identification result (i.e., which phase is suffering from an abnormality) by the abnormal phase identifying function 102. The corrective voltages Vu_emf, Vv_emf, Vw_emf serve to cancel out induced voltages generated by the electric motor 22.

Specifically, if the U-phase is suffering an abnormality, then the corrective voltage calculator 146 calculates corrective voltages Vu_emf, Vv_emf, Vw_emf according to the expressions (19) through (21) shown below.

$$Vu\_emf = 0 \quad (19)$$

$$Vv\_emf = -(\sqrt{3}/2) Ke \times \omega \times \sin \Phi \quad (20)$$

$$Vw\_emf = (\sqrt{3}/2) Ke \times \omega \times \sin \Phi \quad (21)$$

In the above expressions (19) through (21), Φ is defined as the sum of the electric angle θ and 270° (Φ=θ+270°) within the range of 0°≤Φ<360°. Ke represents an induced voltage constant for one phase. "√3/2" represents a coefficient for converting the induced voltage from a three-phase component into a two-phase component.

If the V-phase is suffering an abnormality, then the corrective voltage calculator 146 calculates corrective voltages Vu_emf, Vv_emf, Vw_emf according to the expressions (22) through (24) shown below.

$$Vv\_emf = 0 \quad (22)$$

$$Vw\_emf = -(\sqrt{3}/2) Ke \times \omega \times \sin \Phi \quad (23)$$

$$Vu\_emf = (\sqrt{3}/2) Ke \times \omega \times \sin \Phi \quad (24)$$

In the above expressions (22) through (24), Φ is defined as the sum of the electric angle θ and 150° (Φ=θ+150°) within the range of 0°≤Φ<360°.

If the W-phase is suffering an abnormality, then the corrective voltage calculator 146 calculates corrective voltages Vu_emf, Vv_emf, Vw_emf according to the expressions (25) through (27) shown below.

$$Vw\_emf = 0 \quad (25)$$

$$Vu\_emf = -(\sqrt{3}/2) Ke \times \omega \times \sin \Phi \quad (26)$$

$$Vv\_emf = (\sqrt{3}/2) Ke \times \omega \times \sin \Phi \quad (27)$$

In the above expressions (25) through (27), Φ is defined as the sum of the electric angle θ and 30° (Φ=θ+30°) within the range of 0°≤Φ<360°.

(7) First Adder 148, Second Adder 150, and Third Adder 152:

In FIG. 9, the first adder 148 outputs the sum of the base voltage Vu_base of the U-phase and the corrective voltage Vu_emf as a U-phase voltage target value Vu_t to the PWM controller 130. The second adder 150 outputs the sum of the base voltage Vv_base of the V-phase and the corrective voltage Vv_emf as a V-phase voltage target value Vv_t to the PWM controller 130. The third adder 152 outputs the sum of the base voltage Vw_base of the W-phase and the corrective voltage Vw_emf as a W-phase voltage target value Vw_t to the PWM controller 130.

(8) PWM Controller 130:

As with the normal energization controlling mode, the PWM controller 130 energizes the windings 86 of the electric motor 22 through the inverter 36 according to a pulse width modulation (PWM) control process based on the phase voltage command values Vu_t, Vv_t, Vw_t. Specifically, the PWM controller 130 selectively turns on and off the upper SW devices 74 and the lower SW devices 80 of the inverter 36 to energize the windings 86 of the electric motor 22.

C. Advantages of the First Embodiment

According to the first embodiment, as described above, in a state where the q-axis current Iq is zero (S14: YES in FIG. 7) though the q-axis voltage Vq is being applied (S12: YES), a phase other than a combination of phases whose interphase voltage is nearly of nearly 0 volt is detected as an abnormal phase (see FIG. 8). Therefore, an abnormal phase can be detected even though only two current sensors 38, 40 are used to detect phase currents.

According to the first embodiment, if the rotational speed ω of the motor 22 is equal to or smaller than the threshold value TH_ω (S3: YES in FIG. 4), the abnormality determining process is carried out in step S4. In the case where a counter-electromotive force generated by the electric motor 22 adversely affects the accuracy with which to identify an abnormal phase, an abnormal phase is identified only when a certain level of accuracy is secured. As a result, it is possible to prevent an abnormal phase from being detected in error.

According to the first embodiment, if the ECU 50 detects an abnormal phase (S5: YES in FIG. 4) while in the normal energization controlling mode, the phases other than the abnormal phase are energized such that the output power of the motor 22 are increased in the vicinity of an electric angle θ at which the output power of the electric motor 22 drops due to the malfunctioning of the abnormal phase (see FIGS. 11 through 13). Therefore, even in the presence of an abnormal phase, the output power of the electric motor 22 is prevented from being abruptly lowered, and hence the electric motor 22 is capable of stably generating a steering assisting force.

II. Second Embodiment

A. Description of Configurations (Differences with the First Embodiment)

The first embodiment and the second embodiment are different from each other as to some parts of the software used by the ECU 50, but are identical to each other as to the hardware. Those components of the second embodiment which are identical to those of the first embodiment are denoted by identical reference characters, and will not be described in detail below.

B. Processing Sequences and Functions of ECU 50

1. Summary (Differences with the First Embodiment):

The first embodiment and the second embodiment are identical to each other as to the overall processing flow of the ECU 50. The flowchart shown in FIG. 4 and the functional block diagram shown in FIG. 5 are also applicable to the second embodiment, except that the second embodiment is different from the first embodiment in processing details of step S4 shown in FIG. 4. Specifically, the second embodiment uses an abnormality determining process shown in FIG. 14, instead of the abnormality determining process shown in FIG. 7 according to the first embodiment.

Figure 14:
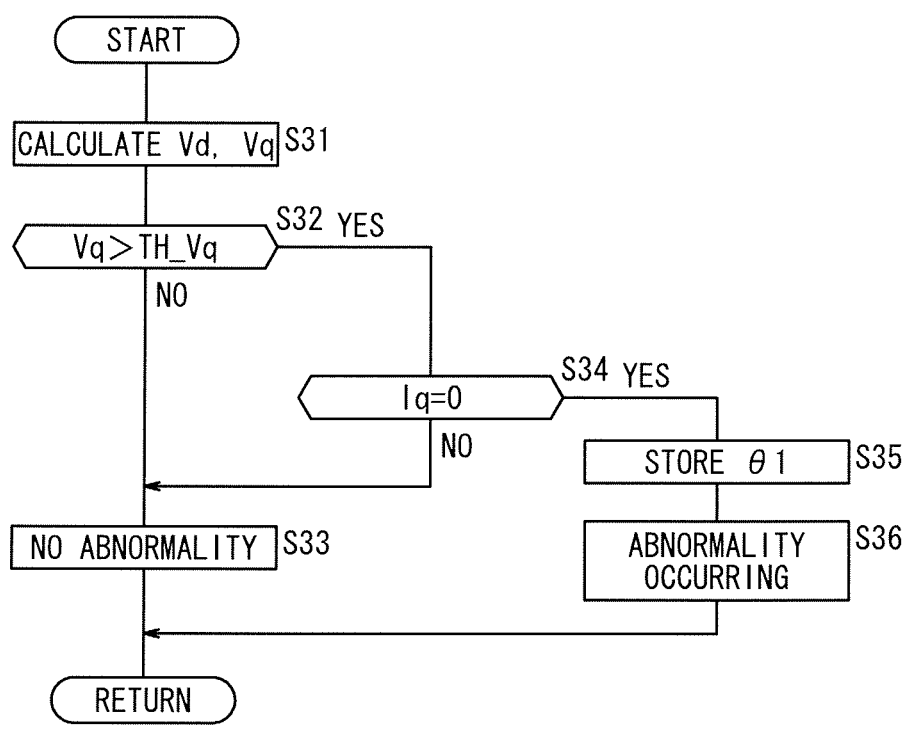
FIG. 14 is a flowchart of an abnormality determining process carried out by an ECU according to a second embodiment of the present invention.

2. Abnormality Determining Process (Abnormality Determining Function 100):

FIG. 14 is a flowchart of the abnormality determining process (abnormality determining function 100) carried out by the ECU 50 according to the second embodiment (details of step S4 shown in FIG. 4). Steps S31 through S34 shown in FIG. 14 are the same as steps S11 through S14 shown in FIG. 7 according to the first embodiment.

In step S35 shown in FIG. 14, the ECU 50 stores an electric angle θ at the time the q-axis current Iq is zero (hereinafter referred to as "abnormality-occurring electric angle θ1"). In step S36, the ECU 50 identifies the occurrence of an abnormality (at this time, which phase is suffering from the abnormality is not identified) as with step S15 shown in FIG. 7.

3. Abnormal Phase Identifying Process (Abnormal Phase Identifying Function 102):

(1) Measuring Principles:

The abnormal phase identifying process (step S6 in FIG. 4) according to the second embodiment identifies an abnormal phase based on the fact that in the event of an abnormality such as a disconnection or the like in any of the phases, no current flows in the electric motor 22 at an electric angle θ inherent in the phase.

Specifically, if the U-phase is suffering an abnormality while no d-axis voltage Vd is being output (Vd=0), then the electric angle θ at which no current flows in the electric motor 22 is 90° and 270°. If the V-phase is suffering an abnormal while no d-axis voltage Vd is being output, then the electric angle θ at which no current flows in the electric motor 22 is 30° and 210°. If the W-phase is suffering an abnormality while no d-axis voltage Vd is being output, then the electric angle θ at which no current flows in the electric motor 22 is 150° and 330°. The electric angle θ at which no current flows in the electric motor 22 on account of an abnormal phase while no d-axis voltage Vd is being output will hereinafter be referred to as "base electric angle θb1".

Figure 15:
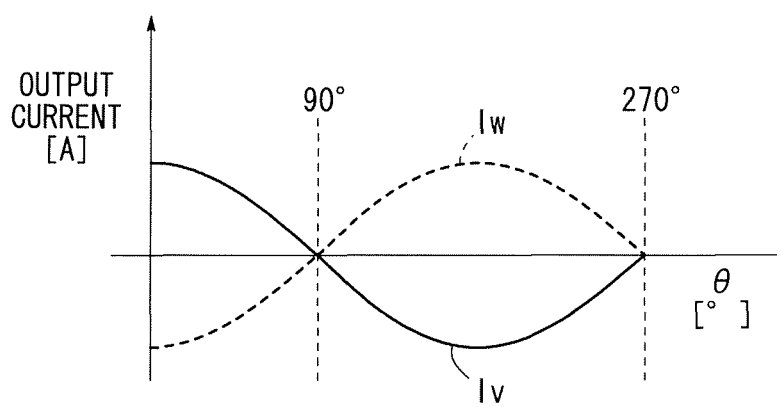
FIG. 15 is a diagram showing, by way of example, waveforms of a V-phase current and a W-phase current at the time a d-axis voltage is zero in the event of an abnormality that occurs in a U-phase.
Figure 16:
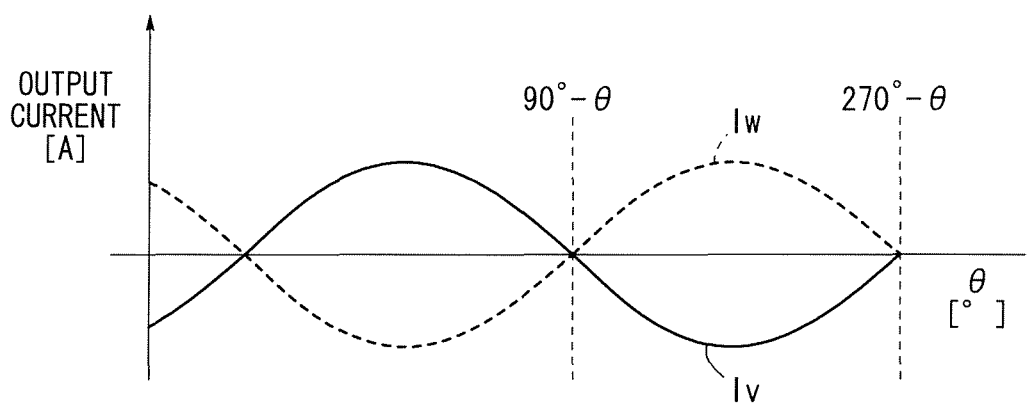
FIG. 16 is a diagram showing, by way of example, waveforms of a V-phase current and a W-phase current at the time the d-axis voltage is not zero in the event of the abnormality that occurs in the U-phase.

While the d-axis voltage Vd is being output (Vd≠0), since motor terminal voltages of the respective phases deviate from each other, the electric angle θ at which no current flows in the electric motor 22 deviates from the base electric angle θb1. If the d-axis voltage Vd is zero while the U-phase is suffering an abnormality, the V-phase current Iv and the W-phase current Iw are indicated as shown in FIG. 15, for example. If the d-axis voltage Vd is not zero while the U-phase is suffering an abnormality, the V-phase current Iv and the W-phase current Iw are indicated as shown in FIG. 16, for example.

According to the second embodiment, if the q-axis current Iq is zero though the d-axis voltage Vd is being output, the electric angle θ (abnormality-occurring electric angle θ1) at the time is stored, and a deviation from the base electric angle θb1 (hereinafter referred to as "corrective electric angle θc") is identified. It is then determined whether a phase to be judged is suffering an abnormality or not based on whether an electric angle θ (corrected base electric angle θb2) produced by correcting the base electric angle θb1 with the corrective electric angle Bc is in agreement with the abnormality-occurring electric angle θ1 or not.

Figure 17:
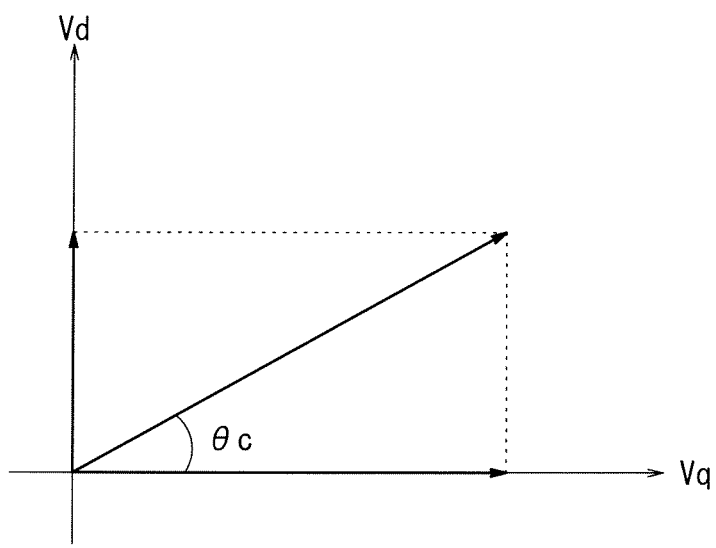
FIG. 17 is a diagram showing a relationship between a d-axis voltage Vd, a q-axis voltage Vq, and a corrective electric angle.

(2) Process of Identifying Corrective Electric Angle θc:

If the d-axis voltage Vd is not zero, then a corrective electric angle θc can be indicated as the phase of a combined vector of the d-axis voltage Vd and the q-axis voltage Vq (see FIG. 17). Therefore, a corrective electric angle θc can be identified if the relationship between d-axis voltages Vd and q-axis voltages Vq, and corrective electric angles θc is determined in advance and stored as a map.

Figure 18:
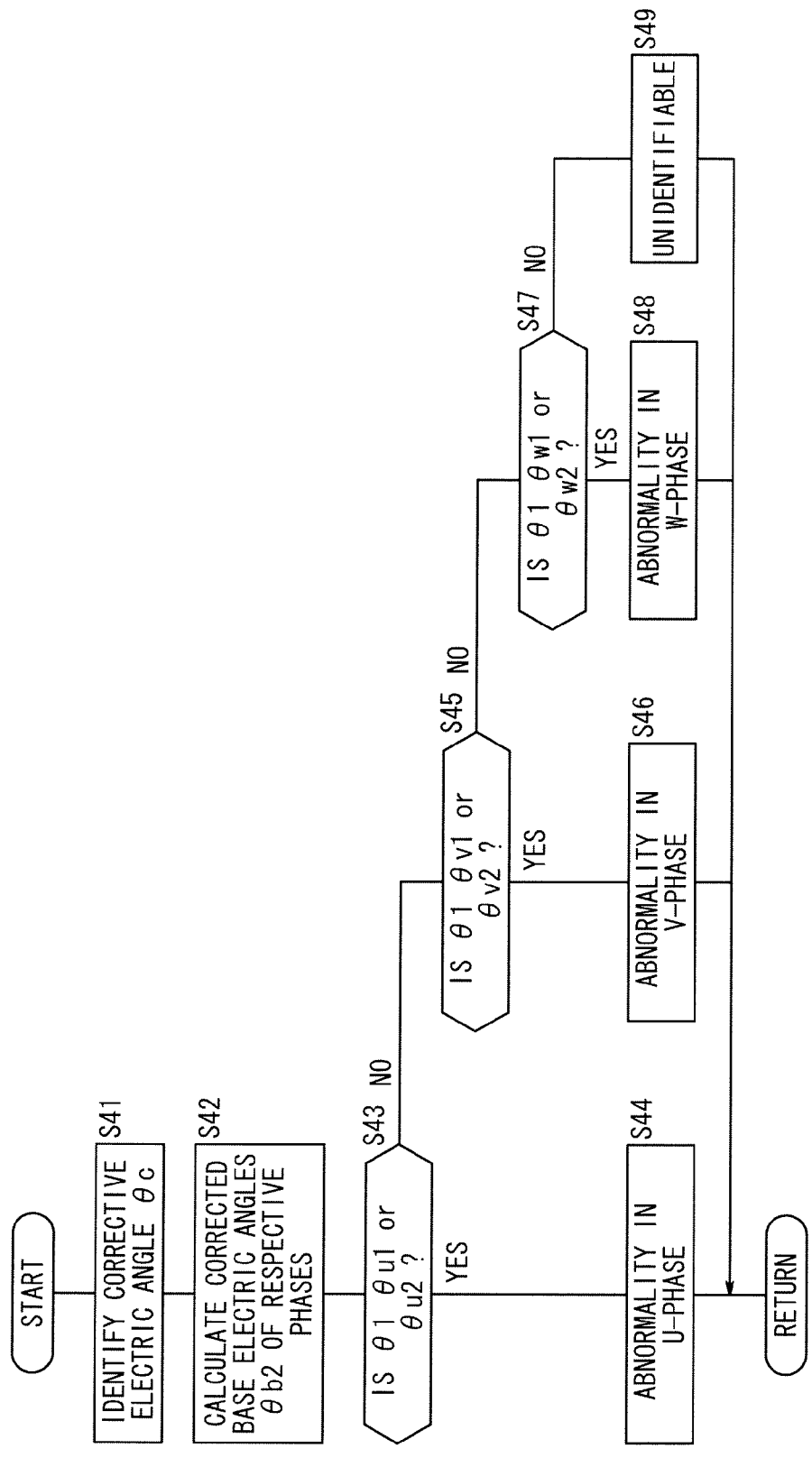
FIG. 18 is a flowchart of an abnormal phase identifying process carried out by the ECU according to the second embodiment.

(3) Flow of Abnormal Phase Identifying Process:

FIG. 18 is a flowchart of an abnormal phase identifying process (abnormal phase identifying function 102) carried out by the ECU 50 according to the second embodiment. In step S41 shown in FIG. 18, the ECU 50 identifies a corrective electric angle θc based on the d-axis voltage Vd and the q-axis voltage Vq (see FIG. 17).

In step S42, the ECU 50 calculates corrected base electric angles θb2 for the respective phases. More specifically, since the base electric angles θb1 of the U-phase are 90° and 270°, the corrected base electric angles θb2 are 90°−θc and 270°−θc. Since the base electric angles θb1 of the V-phase are 30° and 210°, the corrected base electric angles θb2 are 30°−θc and 210°−θc. Since the base electric angles θb1 of the W-phase are 150° and 330°, the corrected base electric angles θb2 are 150°−θc and 330°−θc. For illustrative purposes, the two corrected base electric angles θb2 for the U-phase will be referred to as "corrected base electric angles θu1, θu2", the two corrected base electric angles θb2 for the V-phase as "corrected base electric angles θv1, θv2", and the two corrected base electric angles θb2 for the W-phase as "corrected base electric angles θw1, θw2".

In step S43, the ECU 50 determines whether or not the abnormality-occurring electric angle θ1 is either one of the corrected base electric angles θu1, θu2 of the U-phase. If the abnormality-occurring electric angle θ1 is either one of the corrected base electric angles θu1, θu2 of the U-phase (S43: YES), then it is judged that the U-phase is suffering an abnormality such as a disconnection or the like. In step S44, the ECU 50 identifies the U-phase as suffering an abnormality. If the abnormality-occurring electric angle θ1 is neither the corrected base electric angle θu1 nor θu2 of the U-phase (S43: NO), then control goes to step S45.

In step S45, ECU 50 determines whether or not the abnormality-occurring electric angle θ1 is either one of the corrected base electric angles θv1, θv2 of the V-phase. If the abnormality-occurring electric angle θ1 is either one of the corrected base electric angles θv1, θv2 of the V-phase (S45: YES), then it is judged that the V-phase is suffering an abnormality such as a disconnection or the like. In step S46, the ECU 50 identifies the V-phase as suffering an abnormality. If the abnormality-occurring electric angle θ1 is neither the corrected base electric angle θv1 nor θv2 of the V-phase (S45: NO), then control goes to step S47.

In step S47, ECU 50 determines whether or not the abnormality-occurring electric angle θ1 is either one of the corrected base electric angles θw1, θw2 of the W-phase. If the abnormality-occurring electric angle θ1 is either one of the corrected base electric angles θw1, θw2 of the W-phase (S47: YES), then it is judged that the W-phase is suffering an abnormality such as a disconnection or the like. In step S48, the ECU 50 identifies the W-phase as suffering an abnormality. If the abnormality-occurring electric angle θ1 is neither the corrected base electric angle θw1 nor θw2 of the W-phase (S47: NO), then the ECU 50 is unable to identify a phase in which the abnormality is occurring (abnormal phase). In this case, two phases may be suffering abnormalities which prevent currents from flowing in the two phases. In step S49, the ECU 50 decides that it is unable to identify an abnormal phase. The ECU 50 then shuts down the electric motor 22 according to a fail-safe function thereof.

In the processing sequence shown in FIG. 18, the ECU 50 determines whether the abnormality-occurring electric angle θ1 is in agreement with the corrected base electric angle θb2 of each phase or not. It is possible to perform a sequence in view of a measuring error. For example, a range defined by two threshold values on both sides of the corrected base electric angle θu1 of the U-phase, for example, may be established, and if the abnormality-occurring electric angle θ1 falls within the range thus defined, then the ECU 50 can identify the U-phase as suffering an abnormality such as a disconnection or the like.

4. Abnormality-Occurring Energization Controlling Mode (Abnormality-Occurring Energization Controlling Function 108):

In the second embodiment, the ECU 50 in the abnormality-occurring energization controlling mode has the same functions as with the first embodiment (see FIGS. 9 through 13 and the description relevant thereto).

C. Advantages of the Second Embodiment

According to the second embodiment, as described above, the ECU 50 calculates a corrected base electric angle θb2 (S42 in FIG. 18) at which the q-axis current Iq is zero (S34: YES in FIG. 14) though the q-axis voltage Vq is being applied (S32: YES), and determines an abnormal phase based on the corrected base electric angle θb2 (S43 through S49). Therefore, an abnormal phase can be detected even though only two current sensors 38, 40 are used to detect phase currents.

According to the second embodiment, a corrective electric angle θc is identified based on the d-axis voltage Vd and the q-axis voltage Vq (see FIG. 17), and an abnormal phase is determined based on the base electric angle θb1 and the corrective electric angle θc. Therefore, even if the electric angle θ at which the q-axis current Iq is zero due to the generation of the d-axis voltage Vd deviates from the base electric angle θb1 (see FIG. 16), it is possible to correct the base electric angle θb1 in view of the effect of the d-axis voltage Vd. Therefore, an abnormal phase can be determined highly accurately.

According to the second embodiment, if the rotational speed ω of the motor 22 is equal to or smaller than the threshold value TH_ω (S3: YES in FIG. 4), the abnormality determining process is carried out in step S4. In the case where a counter-electromotive force generated by the electric motor 22 adversely affects the accuracy with which to identify an abnormal phase, an abnormal phase is detected only when a certain level of accuracy is secured. As a result, it is possible to prevent an abnormal phase from being detected in error.

III. Modifications

The present invention is not limited to the above embodiments, but may adopt various arrangements based on the contents of the present description. For example, the present invention may adopt the following arrangements:

A. Identification of Abnormal Phase

In the above embodiments, it is determined whether an abnormality is occurring in any of the phases or not based on whether or not the q-axis current Iq is zero (S14 in FIG. 7 and S34 in FIG. 14). However, a positive threshold value and a negative threshold value near zero may be established, and it may be determined whether an abnormality is occurring in any of the phases or not based on whether or not the q-axis current Iq falls between the positive threshold value and the negative threshold value. Alternatively, it may be determined whether an abnormality is occurring in any of the phases or not based on whether or not the absolute value of the q-axis current Iq is equal to or smaller than a positive threshold value near zero.

In the second embodiment, an abnormal phase is determined using the corrected electric angle θb2 which is produced by reflecting the corrective electric angle θc in the base electric angle θc. However, an abnormal phase may be determined using the base electric angle θb1 only when no d-axis voltage Vd is generated.

B. Modifications of Output Forms of Various Values in the Abnormality-Occurring Energization Controlling Mode FIGS. 19 through 24 show first through sixth modifications with respect to the relationship between electric angles θ of the electric motor 22 and output voltages for the respective phases in the abnormality-occurring energization controlling mode. Stated otherwise, FIGS. 19 through 24 show modifications of the processing sequence of the gain setting section 140 (see FIG. 9). In FIGS. 19 through 24, it is assumed that the W-phase is suffering a disconnection.

Figure 19:
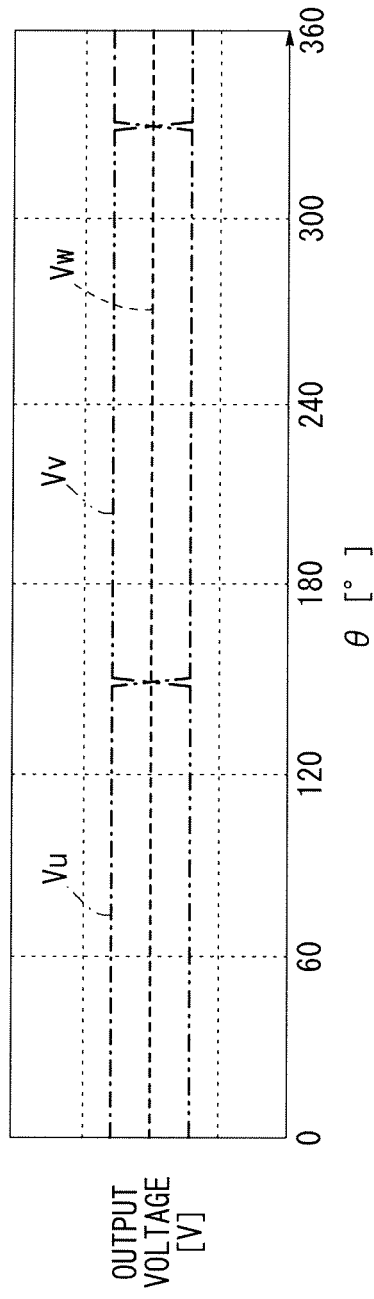
FIG. 19 is a diagram showing a first modification of the relationship between electric angles of the electric motor and output voltages of the respective phases thereof in the abnormality-occurring energization controlling mode.

FIG. 19 shows an example in which the U-phase voltage Vu and the V-phase voltage Vv are output in trapezoidal waveforms depending on the electric angle θ, the second torque command value Tr_c2 and the vehicle speed V.

Figure 20:
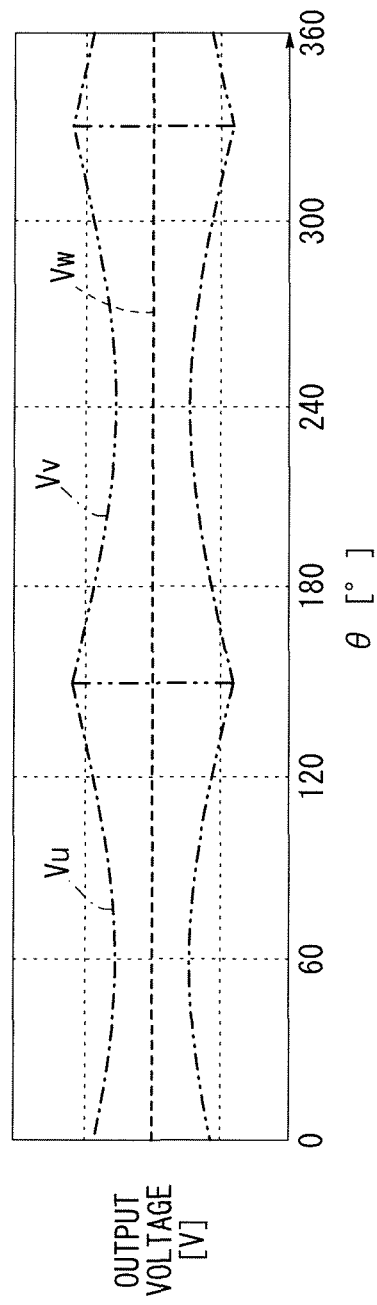
FIG. 20 is a diagram showing a second modification of the relationship between electric angles of the electric motor and output voltages of the respective phases thereof in the abnormality-occurring energization controlling mode.

FIG. 20 shows an example in which the U-phase voltage Vu and the V-phase voltage Vv are output in waveforms represented by "(1−0.5 sin θ)" depending on the electric angle θ, the second torque command value Tr_c2 and the vehicle speed V.

Figure 21:
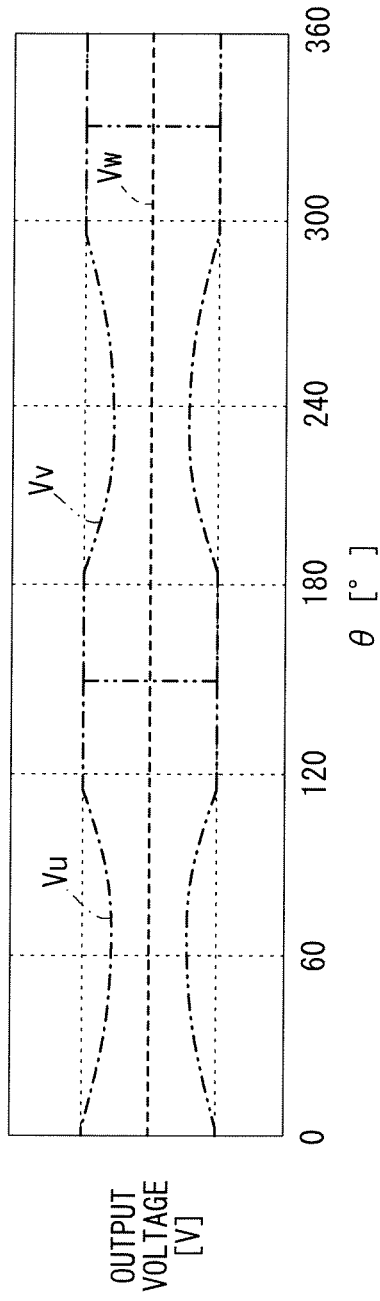
FIG. 21 is a diagram showing a third modification of the relationship between electric angles of the electric motor and output voltages of the respective phases thereof in the abnormality-occurring energization controlling mode.

FIG. 21 shows an example in which the U-phase voltage Vu and the V-phase voltage Vv are output in waveforms represented by "1/cos(θ−60°)" depending on the electric angle θ, the second torque command value Tr_c2 and the vehicle speed V. However, a limiting control process, i.e., a control process for providing an upper limit value and a lower limit value, is carried out for voltages that are higher than 1.5 times the maximum voltage in the normal energization controlling mode.

Figure 22:
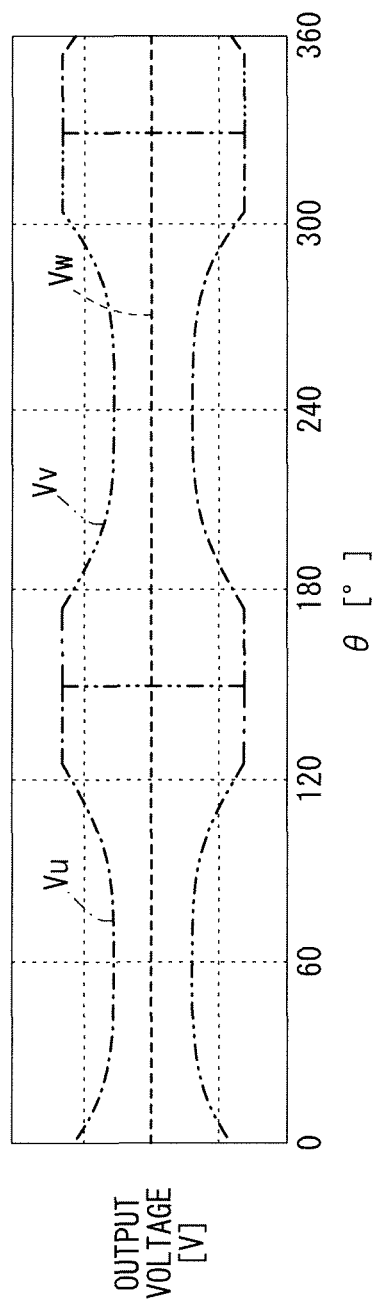
FIG. 22 is a diagram showing a fourth modification of the relationship between electric angles of the electric motor and output voltages of the respective phases thereof in the abnormality-occurring energization controlling mode.

FIG. 22 shows an example in which the U-phase voltage Vu and the V-phase voltage Vv are output in waveforms represented by "1/cos(θ−60°)" depending on the electric angle θ, the second torque command value Tr_c2 and the vehicle speed V. However, a limiting control process is carried out for voltages that are higher than twice the maximum voltage in the normal energization controlling mode.

Figure 23:
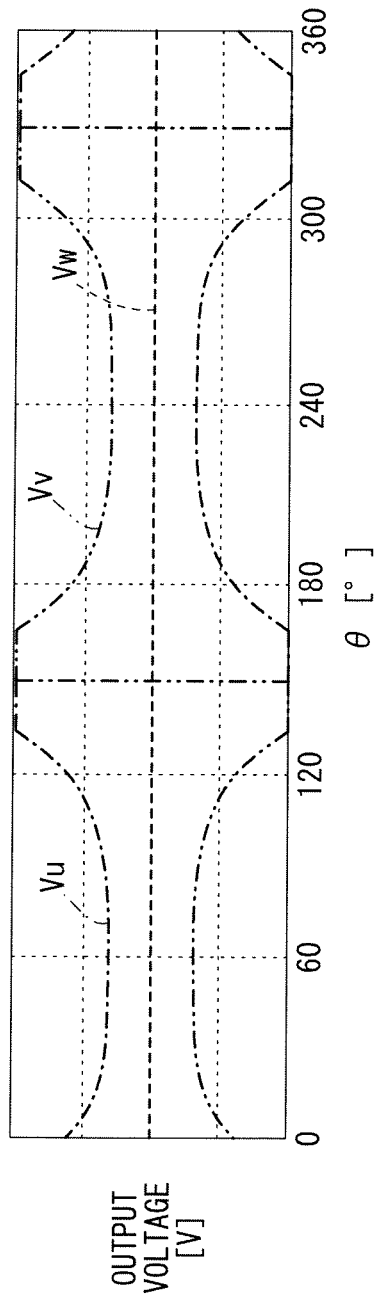
FIG. 23 is a diagram showing a fifth modification of the relationship between electric angles of the electric motor and output voltages of the respective phases thereof in the abnormality-occurring energization controlling mode.

FIG. 23 shows an example in which the U-phase voltage Vu and the V-phase voltage Vv are output in waveforms represented by "1/cos(θ−60°)" depending on the electric angle θ, the second torque command value Tr_c2 and the vehicle speed V. However, a limiting control process is carried out for voltages that are higher than three times the maximum voltage in the normal energization controlling mode.

Figure 24:
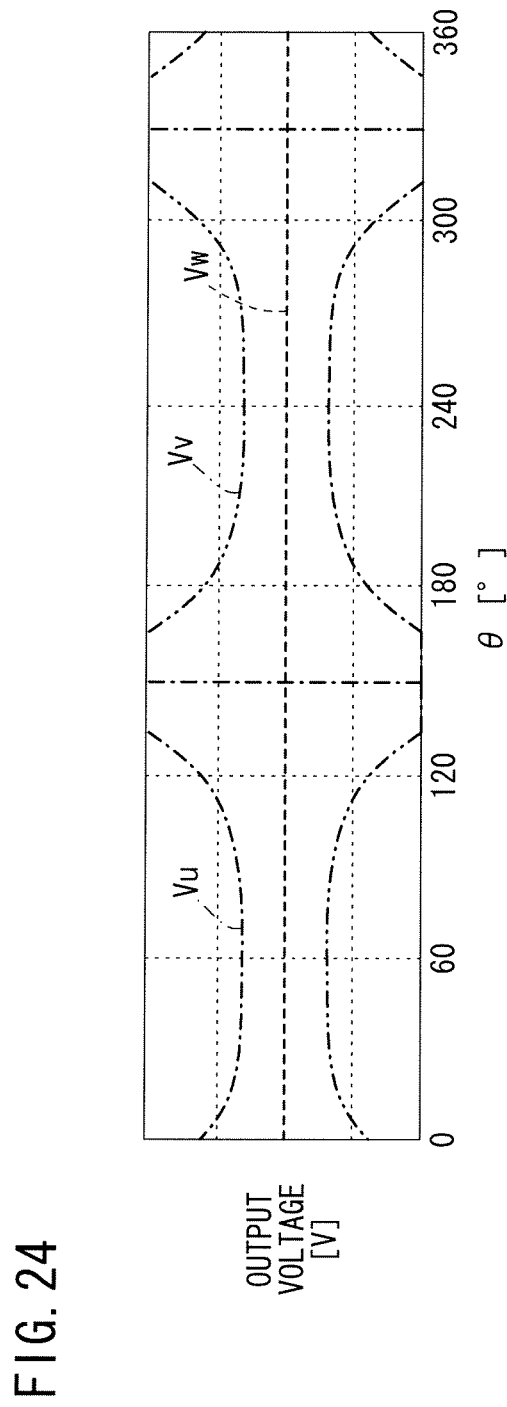
FIG. 24 is a diagram showing a sixth modification of the relationship between electric angles of the electric motor and output voltages of the respective phases thereof in the abnormality-occurring energization controlling mode.

FIG. 24 shows an example in which the U-phase voltage Vu and the V-phase voltage Vv are output in waveforms represented by "1/cos(θ−60°)" depending on the electric angle θ, the second torque command value Tr_c2 and the vehicle speed V.

C. Application of Rotational Speed ω of Electric Motor 22

In the above embodiments, the rotational speed ω and the threshold value TH_ω are compared with each other, and the abnormality determining process (S4) is carried out only when the rotational speed ω is equal to or smaller than the threshold value TH_ω (S3: YES in FIG. 4). However, it is possible to use an arrangement which does not compare the rotational speed ω and the threshold value TH_ω with each other.

Although certain preferred embodiments of the present invention have been shown and described in detail, it should be understood that various changes and modifications may be made therein without departing from the scope of the appended claims.

What is claimed is:

1. An electric power steering apparatus comprising:
an inverter for supplying three-phase AC electric power to three phases of an electric motor;
a current coordinate converting unit for converting currents flowing in the three phases of the electric motor into d-q coordinate currents including a d-axis current as an exciting current component and a q-axis current as a torque current component;
a voltage coordinate converting unit for converting three-phase voltages applied to the electric motor into a d-axis voltage and a q-axis voltage;
an abnormal phase detecting unit for determining a combination of phases whose interphase voltage is of nearly zero volts in a state where the q-axis current is equal to or smaller than a first threshold value though the q-axis voltage is being applied, and detecting a phase other than the combination of phases as an abnormal phase; and
a rotational speed detecting unit for detecting a rotational speed of the electric motor;
wherein the abnormal phase detecting unit is operated when the rotational speed is equal to or smaller than a second threshold value,
wherein the second threshold value comprises a threshold value for determining whether the electric motor is generating an excessive counter-electromotive force which makes accuracy of detecting the abnormal phase by the abnormal phase detecting unit inadequate.

2. The electric power steering apparatus according to claim 1, wherein if the abnormal phase detecting unit detects an abnormal phase, the phases other than the abnormal phase are energized at a predetermined electric angle.

3. The electric power steering apparatus according to claim 1, wherein if the abnormal phase detecting unit detects an abnormal phase while all the three phases are being energized, the phases other than the abnormal phase are energized such that output power of the electric motor is increased near an electric angle at which the output power of the electric motor tends to be reduced due to malfunctioning of the abnormal phase,
wherein when base voltages Vu_base, Vv_base, Vw_base for the three phases of U-phase, V-phase and W-phase are calculated using a gain Gph,
if the U-phase is suffering an abnormality, the base voltages Vu_base, Vv_base, Vw_base are calculated according to expressions (1) through (6):

for $0° \leq \Phi < 180°$, $$Vu\_base = 0 \qquad (1)$$

$$Vv\_base = Gph \times (1 - 0.5 \sin \Phi) \qquad (2)$$

$$Vw\_base = -Gph \times (1 - 0.5 \sin \Phi) \qquad (3); \text{ and}$$

for $180° \leq \Phi < 360°$, $$Vu\_base = 0 \qquad (4)$$

$$Vv\_base = Gph \times (-1 - 0.5 \sin \Phi) \qquad (5)$$

$$Vw\_base = -Gph \times (-1 - 0.5 \sin \Phi) \qquad (6);$$

in the expressions (1) through (6), Φ is defined as a sum of the electric angle and 270°,
if the V-phase is suffering an abnormality, the base voltages Vu_base, Vv_base, Vw_base are calculated according to expressions (7) through (12):

for $0° \leq \Phi < 180°$, $$Vv\_base = 0 \qquad (7)$$

$$Vw\_base = Gph \times (1 - 0.5 \sin \Phi) \qquad (8)$$

$$Vu\_base = -Gph \times (1 - 0.5 \sin \Phi) \qquad (9); \text{ and}$$

for $180° \leq \Phi < 360°$, $$Vv\_base = 0 \qquad (10)$$

$$Vw\_base = Gph \times (-1 - 0.5 \sin \Phi) \qquad (11)$$

$$Vu\_base = -Gph \times (-1 - 0.5 \sin \Phi) \qquad (12);$$

in expressions (7) through (12), Φ is defined as a sum of the electric angle and 150°, and
if W-phase is suffering an abnormality, the base voltages Vu_base, Vv_base Vw_base are calculated according to the expressions (13) through (18):

for $0° \leq \Phi < 180°$, $$Vw\_base = 0 \qquad (13)$$

$$Vu\_base = Gph \times (1 - 0.5 \sin \Phi) \qquad (14)$$

$$Vv\_base = -Gph \times (1 - 0.5 \sin \Phi) \qquad (15); \text{ and}$$

for $180° \leq \Phi < 360°$, $$Vw\_base = 0 \qquad (16)$$

$$Vu\_base = Gph \times (-1 - 0.5 \sin \Phi) \qquad (17)$$

$$Vv\_base = -Gph \times (-1 - 0.5 \sin \Phi) \qquad (18);$$

in expressions (7) through (12), Φ is defined as a sum of the electric angle and 30°.

* * * * *